US010044055B2

(12) United States Patent
Wilkinson et al.

(10) Patent No.: US 10,044,055 B2
(45) Date of Patent: Aug. 7, 2018

(54) APPARATUS AND METHOD FOR CONTROLLING VARIABLE POWER CONDITIONS IN A FUEL CELL

(75) Inventors: David P. Wilkinson, North Vancouver (CA); Alfred Lam, Vancouver (CA)

(73) Assignees: THE UNIVERSITY OF BRITISH COLUMBIA, Vancouver (CA); NATIONAL RESEARCH COUNCIL OF CANADA, Ottawa (CA)

(*) Notice: Subject to any disclaimer, the term of this patent is extended or adjusted under 35 U.S.C. 154(b) by 1236 days.

(21) Appl. No.: 13/124,480

(22) PCT Filed: Oct. 14, 2009

(86) PCT No.: PCT/CA2009/001462
§ 371 (c)(1),
(2), (4) Date: Jun. 16, 2011

(87) PCT Pub. No.: WO2010/043038
PCT Pub. Date: Apr. 22, 2010

(65) Prior Publication Data
US 2011/0269039 A1 Nov. 3, 2011

Related U.S. Application Data

(60) Provisional application No. 61/136,925, filed on Oct. 15, 2008.

(51) Int. Cl.
*H01M 8/04* (2016.01)
*H01M 8/1011* (2016.01)
(Continued)

(52) U.S. Cl.
CPC ..... *H01M 8/1011* (2013.01); *H01M 8/04186* (2013.01); *H01M 8/04276* (2013.01);
(Continued)

(58) Field of Classification Search
CPC .. H01M 8/04; H01M 8/04276; H01M 8/1011; H01M 8/08; H01M 8/04186;
(Continued)

(56) References Cited

U.S. PATENT DOCUMENTS 6,727,015 B1* 4/2004 Putter et al. .............. 429/498
7,220,503 B2 5/2007 Boehm
(Continued)

FOREIGN PATENT DOCUMENTS

| CA | 2409459 A1 | 4/2003 |
| EP | 063804 A2 | 11/1982 |
| WO | 2005/121917 | 12/2005 |

OTHER PUBLICATIONS

Lam et al., "Control of Variable Power Conditions for a Membraneless Direct Methane Fuel Cell," Journal of Power Sources 194: 991-6, 2009.
(Continued)

*Primary Examiner* — Milton I Cano
*Assistant Examiner* — Philip A Stuckey
(74) *Attorney, Agent, or Firm* — Davis Wright Tremaine LLP; Heather M. Colburn

(57) ABSTRACT

A fuel cell comprises an anode having an inner face and an outer face fluidly communicable with a fuel; a cathode having an inner face ionically communicable with and physically separated from the anode inner face, and having an outer face fluidly communicable with an oxidant; and at least one movable guard movable over at least one of the anode outer face, cathode outer face, anode inner face, and cathode inner face. The guard has a structure sufficient to block at least part of one or more of the anode's communication with the fuel, the cathode's communication with the oxidant, and the ionic communication between the anode
(Continued)

and cathode thereby reducing a maximum potential active area of the fuel cell to an effective active area of the fuel cell.

14 Claims, 19 Drawing Sheets

(51) Int. Cl.
  *H01M 8/04186*   (2016.01)
  *H01M 8/04276*   (2016.01)
  *H01M 8/04537*   (2016.01)
  *H01M 8/04858*   (2016.01)
  *H01M 8/08*   (2016.01)

(52) U.S. Cl.
  CPC ... *H01M 8/04582* (2013.01); *H01M 8/04611* (2013.01); *H01M 8/04932* (2013.01); *H01M 8/08* (2013.01); *Y02E 60/523* (2013.01)

(58) Field of Classification Search
  CPC ......... H01M 8/04611; H01M 8/04582; H01M 8/04932; Y02E 60/523
  See application file for complete search history.

(56) References Cited

U.S. PATENT DOCUMENTS

| | | |
|---|---|---|
| 7,320,837 B2 | 1/2008 | Fay et al. |
| 2004/0209133 A1* | 10/2004 | Hirsch .............. H01M 8/04089 429/444 |
| 2004/0209136 A1* | 10/2004 | Ren et al. ...................... 429/30 |
| 2005/0118469 A1* | 6/2005 | Leach et al. .................... 429/22 |
| 2005/0164055 A1* | 7/2005 | Hasegawa et al. ............. 429/22 |
| 2005/0170224 A1* | 8/2005 | Ren et al. ....................... 429/15 |
| 2005/0202291 A1* | 9/2005 | Schweizer ...................... 429/13 |
| 2006/0263672 A1* | 11/2006 | Lee et al. ........................ 429/39 |
| 2006/0269814 A1 | 11/2006 | Horton et al. |
| 2007/0026279 A1* | 2/2007 | Hirsch et al. ................... 429/22 |
| 2007/0141405 A1 | 6/2007 | Lai et al. |
| 2007/0259247 A1* | 11/2007 | Kibune et al. ................. 429/34 |
| 2008/0044693 A1 | 2/2008 | Benziger et al. |

OTHER PUBLICATIONS

Lam et al., "Novel Approach to Membraneless Direct Methanol Fuel Cells Using Advanced 3D Anodes," Electrochimica Acta 53:6890-8, 2008.

Wilkinson, et al., "Dynamic Flow Field for Fuel Cells," Electrochemical and Solid-State Letters, vol. 10, Issue 9, Jul. 17, 2007, pp. B155-B160.

U.S. Appl. No. 10/413,986, filed Apr. 15, 2003, by Hirsch et al.

U.S. Appl. No. 10/607,696, filed Jun. 27, 2003, by Beckmann et al.

* cited by examiner

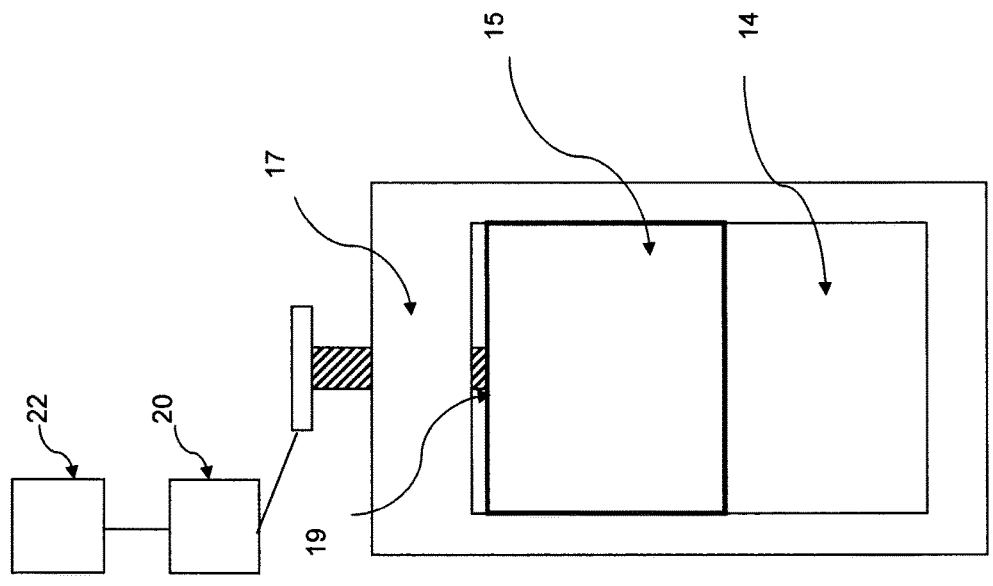
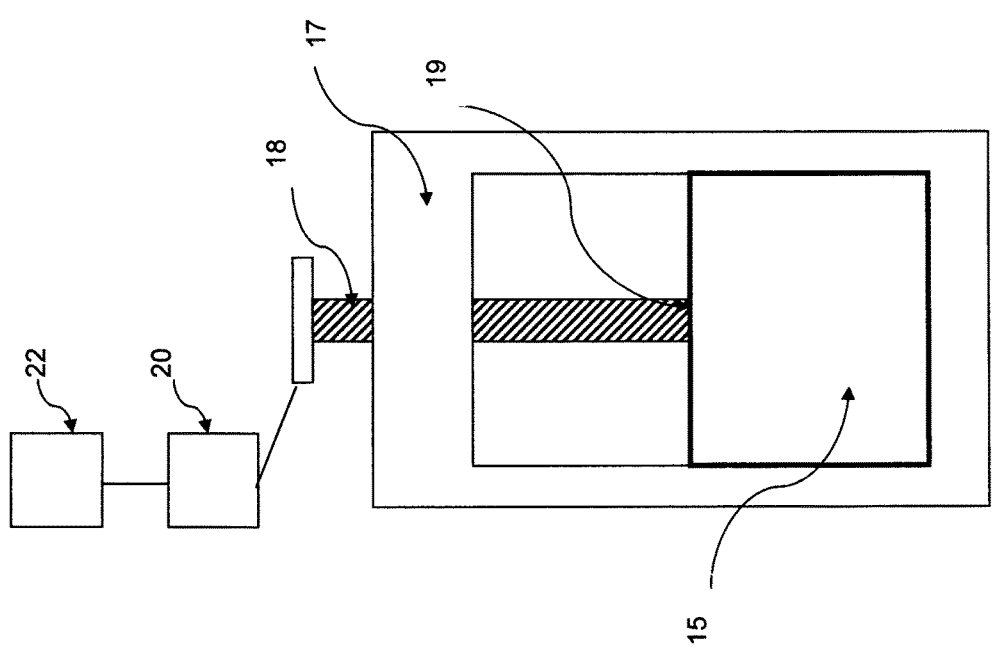

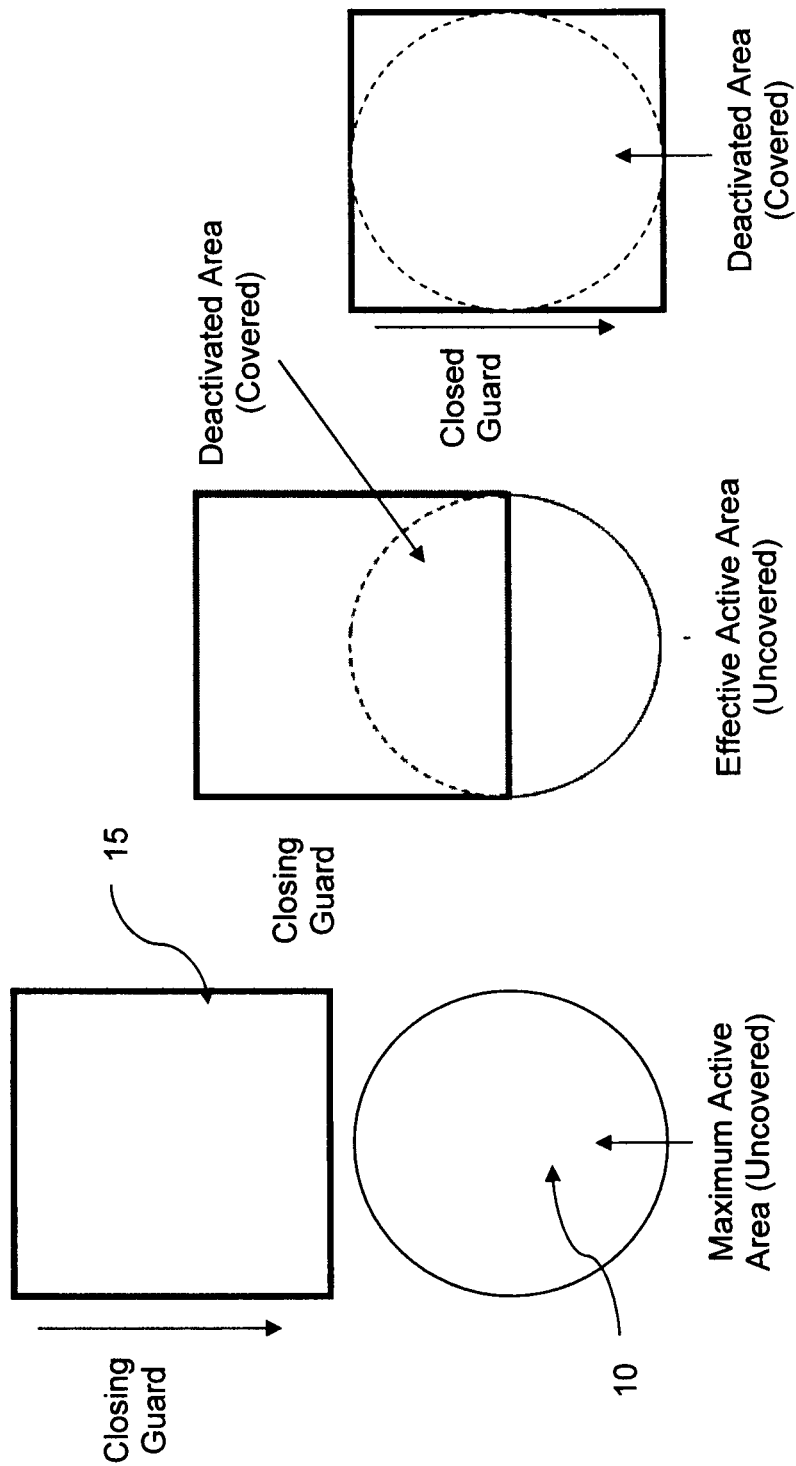

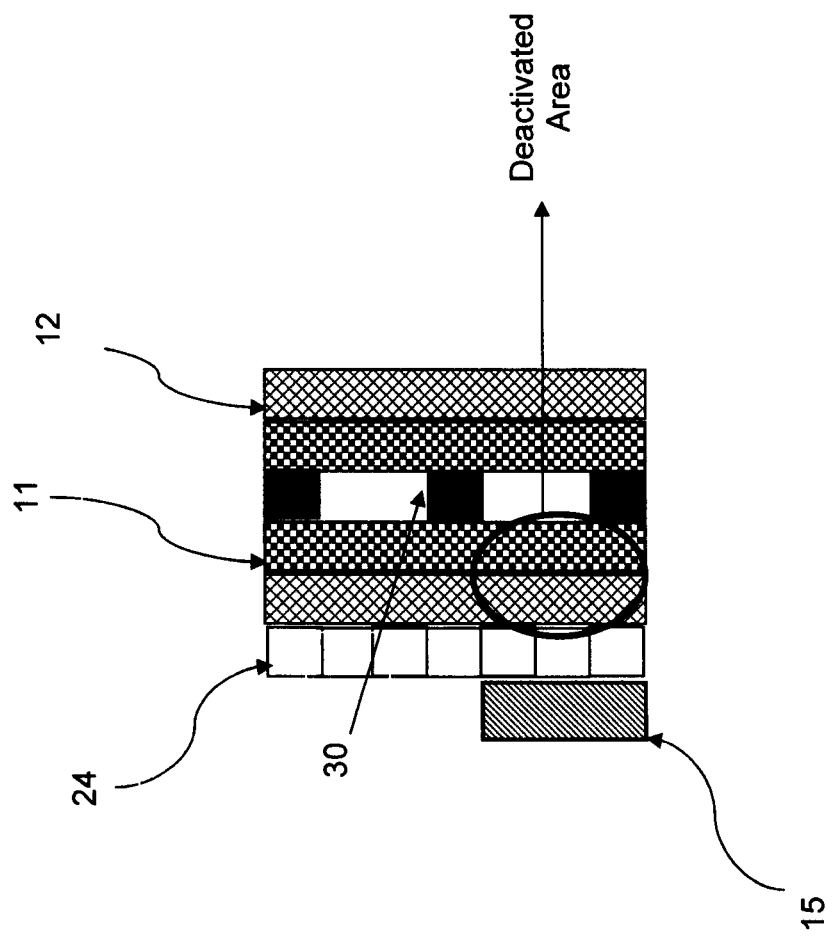
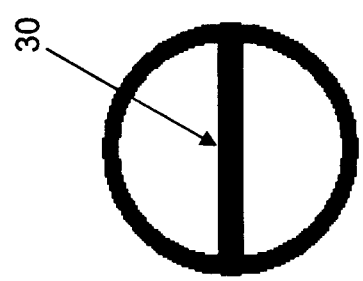
Figure 10(b)
Figure 10(a)

APPARATUS AND METHOD FOR CONTROLLING VARIABLE POWER CONDITIONS IN A FUEL CELL

FIELD OF THE INVENTION

This invention relates generally to the field of fuel cells, and in particular to an apparatus and a method for controlling variable power conditions in a fuel cell.

BACKGROUND OF THE INVENTION

The advancement of portable electronics and the continual integration of functionality into a single all-encompassing device has created an increased demand on energy supply. The incumbent Li ion battery is not projected to sufficiently accommodate this growing demand. An attractive alternative for devices operating in the <100 W range is the direct methanol fuel cell (DMFC). The DMFC could potentially bridge the gap in performance, as methanol has a high energy density (4820 Wh L−1), can be continuously operated through the replacement of a fuel cartridge, and can be easily handled through existing infrastructure.

The DMFC can be operated under a passive or active configuration. The target application largely determines which one is used. For higher power devices (>10 W) an active system is preferred because higher performances can be achieved through the careful control of operating conditions. A typical active DMFC system include balance of plant components to control the operating conditions. A series of sensors, pumps and fluid control systems manage the temperature, humidification and fuel/oxidant stoichiometry of the fuel cell. Additionally the convective nature of the feed streams allow for improved mass transfer and the removal of waste products such as carbon dioxide and water. Although higher power outputs can be achieved, active systems tend to be larger, more complex, and suffer from parasitic power losses due to auxiliary components and electronics. These characteristics limit their use in smaller portable electronic devices in the subwatt to 10 W range.

In contrast with active systems, a passive DMFC system is simple, compact and does not include auxiliary control components. These characteristics are attractive for the integration into small portable devices. In a passive system the fuel and oxidant are supplied through non-parasitic power processes such as capillary action, diffusion and natural convection. The power output however tends to be lower as a result of mass transport limitations with respect to waste product removal of carbon dioxide at the anode and water management at the cathode.

In a DMFC, an aqueous methanol fuel and an oxidant, typically air, are generally used. The electrochemical reactions for this type of fuel cell at ambient temperature and pressure (25 C, 1 atm) are shown in equations 1-3.

Anode Half-cell Reaction:

$$CH_3OH(l) + H_2O(l) \rightarrow CO_2(g) + 6H^+ + 6e^- \quad E_a° = -0.016V \quad (1)$$

Cathode Half-Cell Reaction:

$$3/2 O_2(g) + 6H^+ + 6e^- \rightarrow 3H_2O(l) \quad E_c° = 1.229V \quad (2)$$

Overall Reaction:

$$CH_3OH(l) + 3/2 O_2(g) \rightarrow 2H_2O(l) + CO_2(g) \quad E° = 1.213V \quad (3)$$

The DMFC is an example of direct liquid fuel cells that use liquid fuels directly as the fuel, and a number of architectures for such cells are known in the art. At the core of a conventional DMFC is the membrane electrode assembly (MEA). It consists of a solid polymer electrolyte membrane (PEM) compressed between an anode and cathode diffusion electrode. The electrodes are typically made from a Teflon® coated carbon cloth, paper or felt with a carbon supported catalyst layer applied to a single side. Nafion® is commonly used as an electrolyte due to its high ionic conductivity and good thermal and mechanical stability. A common difficulty for conventional fuel cell technologies is the ability to manage variable power demand conditions, for example as may occur in vehicles or in electronics powered by fuel cells in which changes in power demand are frequent. Fuel cells are typically configured for optimal power output under specific conditions, and when these conditions are changed, the fuel cell must then operate under suboptimal conditions. Efforts to address this issue with fuel cells have generally focused on the so-called balance of plant (BOP) aspects of the fuel cell system in which various methods have been devised to alter the power output of the system. For example, in active DMFCs, a common practice is to control the concentration of the methanol fuel via a series of sensors, pumps and valves that manipulate the concentration of the fuel being fed into the fuel cell to compensate for the variable power demands of the device being powered. This not only leads to increases in system complexity and cost, but also to the fuel cell operating under suboptimal conditions, frequently resulting in lowered efficiency, performance and durability. For passive systems, the issue is more serious as they do not contain additional BOP components to control the fuel concentration or stoichiometry at different power levels. Similar issues are faced in hydrogen fuel cells.

SUMMARY OF THE INVENTION

According to one aspect of the invention there is provided a fuel cell comprising an anode, a cathode and an adjustable barrier means (guard) for selectively deactivating at least a portion of the maximum potential active area of an electrode surface to selectively create an effective active area of the electrode surface, such that a power output of the fuel cell is reduced. An example of the invention is a membraneless direct liquid fuel cell comprising an anode, a cathode and an adjustable barrier means for selectively deactivating at least a portion of the maximum active area of the fuel cell to selectively create an effective active area of the fuel cell.

Another aspect of the invention is a method for operating a fuel cell under variable load conditions, the method comprising the step of selectively moving an adjustable barrier means so as to selectively deactivate at least a portion of the maximum active area of the fuel cell to selectively create an effective active area of the fuel cell such that the total power output of the cell is reduced. It is yet another aspect of the invention to perform the opposite process, whereby the total power output of the fuel cell is increased by the method comprising the step of selectively moving an adjustable barrier means so as to selectively expose (or "reactivate") a region of the maximum active area of the fuel cell that was previously deactivated by the adjustable barrier means to selectively create a different effective active area of the fuel cell such that the total power output of the cell is increased.

The invention can also be used as a failure detection tool. For instance, in a single cell, the voltage should be approximately constant for the different active areas. If there is a large deviation from the expected value, there may be a failure in the open region of the single cell. In addition, the guard can close the affected region, and open a different section to compensate for the failure.

According to an aspect of the invention, there is provided a fuel cell having an anode having an inner face and an outer face fluidly communicable with a fuel; a cathode having an inner face ionically communicable with and physically separated from the anode inner face, and having an outer face fluidly communicable with an oxidant, the cathode inner face being ionically communicable with the anode inner face by an electrolyte; and at least one movable guard movable over at least one of the anode outer face, cathode outer face, anode inner face, and cathode inner face. The guard has a structure sufficient to block at least part of one or more of the anode's communication with the fuel, the cathode's communication with the oxidant, and the ionic communication between the anode and cathode thereby reducing a maximum potential active area of an electrode surface to an effective active area of the electrode surface, such that a power output of the fuel cell is reduced.

The fuel cell may include a spacer assembly in between the anode and cathode. The spacer assembly includes an electrolyte chamber in between the anode and the cathode, the electrolyte chamber for containing a liquid electrolyte that provides ionic communication between the anode and cathode inner faces.

The guard may be movable within the frame to block at least part of the inner faces of the anode and cathode from ionically communicating with each other.

The guard structure may be selected from a group consisting of: a solid plate, a perforated plate, a shuttered gate having multiple movable slats, and a diaphragm shutter.

The fuel cell may include any of an ionically conducting membrane in between the anode and cathode, and the guard can be movable over only at least one of the anode outer face and cathode outer face; a porous separator in between the anode and cathode; and a lateral diffusion barrier in between the anode and cathode or integrated into one or both of the anode and cathode.

According to another aspect of the invention, there is provided a fuel cell having an anode having an inner face and an outer face fluidly communicable with a fuel; a cathode having an inner face ionically communicable with and physically separated from the anode inner face, and having an outer face fluidly communicable with an oxidant; at least one diffusion barrier each covering one or both of the anode and cathode outer faces; and at least one movable guard movable over at least one of the diffusion barrier, anode outer face, cathode outer face, anode inner face, and cathode inner face. The guard has a structure sufficient to block at least part of one or more of the anode's communication with the fuel, the cathode's communication with the oxidant, and the ionic communication between the anode and cathode thereby reducing a maximum potential active area of an electrode surface to an effective active area of the electrode surface, such that a power output of the fuel cell is reduced. The cathode inner face can be ionically communicable with the anode inner face by an electrolyte.

The guard structure can be a perforated plate and the diffusion barrier has openings alignable with perforations in the perforated plate.

The guard can be movable to cover the outer surface of the cathode.

The guard can cover at least one of the anode and cathode outer surfaces, and can be composed of an electrically conductive material such that the guard functions as a current collector.

According to a third aspect of the invention, there is provided a fuel cell system having a fuel cell as described in any of the aforementioned aspects; an actuator movably connected to the guard; and a actuator controller communicative with the actuator and having a memory programmed with steps and instructions to control the actuator to move the guard into a position corresponding to a desired effective active area and consequent power output.

The desired effective active area can be selected to produce a selected current density, and the controller can be programmed to control the actuator to move the guard in response to varying load conditions on the fuel cell to produce a selected current density and consequently a constant selected voltage and power density of the fuel cell.

The fuel cell of the aforementioned aspects may be a passive fuel cell or an active fuel cell.

According to a further aspect of the invention, there is provided a method for controlling an active area of a fuel cell having an anode having an inner face and an outer face fluidly communicable with a fuel; a cathode having an inner face ionically communicable with and physically separated from the anode inner face, and having an outer face fluidly communicable with an oxidant; and at least one movable guard movable over at least one of the anode outer face, cathode outer face, anode inner face, and cathode inner face. The method includes moving the guard to block at least part of one or more of the anode's communication with the fuel, the cathode's communication with the oxidant, and the ionic communication between the anode and cathode such that a maximum potential active area of an electrode surface is reduced to an effective active area of the electrode surface such that a power output of the fuel cell is reduced. The cathode inner face of the fuel cell may be ionically communicable with the anode inner face of the fuel cell by an electrolyte.

The method can include determining a load on the fuel cell at a particular fuel concentration; and moving the guard to a position corresponding to an effective active area that produces a selected current density in the fuel cell for the determined load at the particular fuel concentration.

The method can also include monitoring a varying load on the fuel cell and moving the guard in response to the varying load to produce a substantially constant current density in the fuel cell while maintaining a constant fuel concentration.

The method can include determining a load on the fuel cell at a particular fuel concentration; and moving the guard to a position corresponding to an effective active area that produces a selected voltage of the fuel cell for the determined load at the particular fuel concentration.

The method may also include monitoring a varying load on the fuel cell and moving the guard in response to the varying load to produce a substantially constant voltage in the fuel cell while maintaining a constant fuel concentration.

The method may include monitoring voltage in multiple active areas, and moving the guard to block one or more active areas that has a voltage that deviates from a selected level.

DESCRIPTION OF DRAWINGS

FIGS. 2(a) and (b) are perspective views of a spacer guard assembly of the fuel cell shown in FIGS. 1(a) and (b) wherein the guard is in a fully closed (FIG. 2(a)) and a fully opened (FIG. 2(b)) position.

FIGS. 3(a) to (c) are conceptual schematic illustrations of the movable guard being moved from a fully opened position, (FIG. 3(a)), to a fully closed position (FIG. 3(c)) to deactivate active regions of the fuel cell.

FIG. 10(a) is a front view of an open spacer in a membraneless fuel cell with a lateral diffusion barrier and FIG. 10(b) is a schematic side sectioned view of the spacer with a lateral diffusion barrier along with other components of the fuel cell including a movable guard according to yet another embodiment of the invention.

DETAILED DESCRIPTION OF EMBODIMENTS OF THE INVENTION

Use of directional terms such as top, bottom, up and down are used in this description merely to assist the reader in understanding the described embodiments and are not intended to restrict the orientation, operation, or connection of the embodiments or any part thereof to the environment or to other structures.

The described embodiments provide a method and apparatus that enable a controlled activation and deactivation of selected segments of an active area of an electrode surface of a fuel cell to provide a variable effective active area of the electrode surface. The active area is the region where an electrochemical reaction takes place (i.e., reactants, ionic conductor, electronic conductor come into triple phase contact). Particularly, the embodiments described herein all relate to fuel cells having a movable guard which can be operated to control the effective active area of the fuel cell in selected regions of the fuel cell's electrode assembly, thereby controlling the power output of the fuel cell. The effective active areas are controlled by using the movable guard to controllably disrupt the triple phase boundary (TPB) in the selected regions. Use of the movable guard enables the fuel cell to be operated under an optimized condition, for example constant areal current density, voltage, areal power density, areal consumption and areal crossover during variable power demands. The movable guard can be used in fuel cells of different types, including gaseous reactant fuel cells such as PEM fuel cells, as well as direct liquid fuel cells such as DMFCs and the direct liquid fuel cells described in PCT application serial number PCT/CA2008/000843. In some embodiments, one or more movable guards are part of a membraneless direct liquid fuel cell and that are used to selectively block areas of an anode or a cathode, or both, of the fuel cell. The fuel cell can be a passive type, or an active type.

The embodiments rely on the principle of disrupting the TPB to control the power output of the fuel cell. As known in the fuel cell art, an electrochemical reaction can only occur at a TPB site where the electrolyte, reactants and an electrically connected catalyst are in contact. If the contact of these components can be controlled, certain portions of the area of an electrode can be activated and deactivated. In the described embodiments, the absolute power output under variable load can be controlled by the deactivation of a segment of the active electrode surface area using the movable guard. In some embodiments, the guard also serves to prevent fuel crossover under variable power conditions. These embodiments are described below with reference to the Figures. Throughout this disclosure, "adjustable barrier means" may also be described as a "guard", and the two terms will be presumed to have the same meaning.

Fuel Cell Structure

Figure 1A:
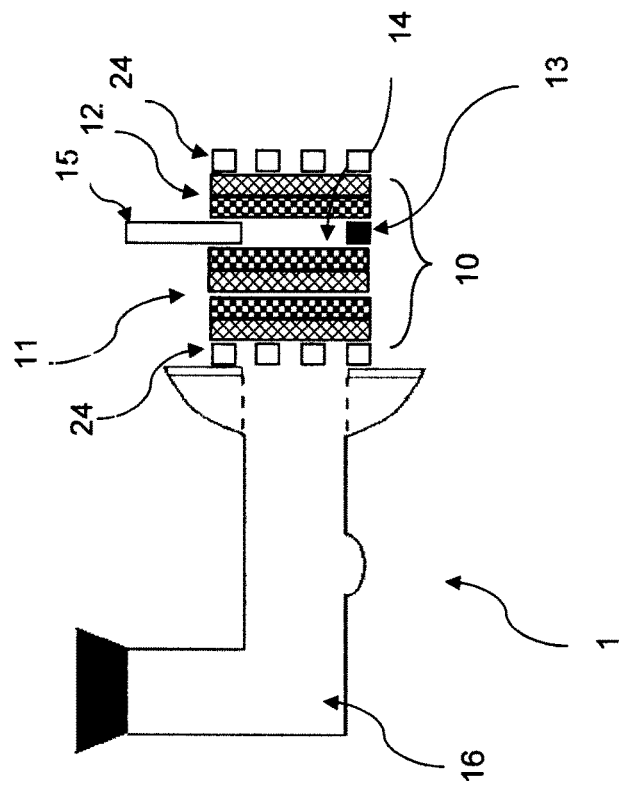
FIGS. 1(a) and (b) are schematic side sectioned views of a membraneless direct liquid fuel cell according to one embodiment of the invention having a movable guard in a partially closed (FIG. 1(a)) and a fully opened (FIG. 1(b)) position.
Figure 1B:
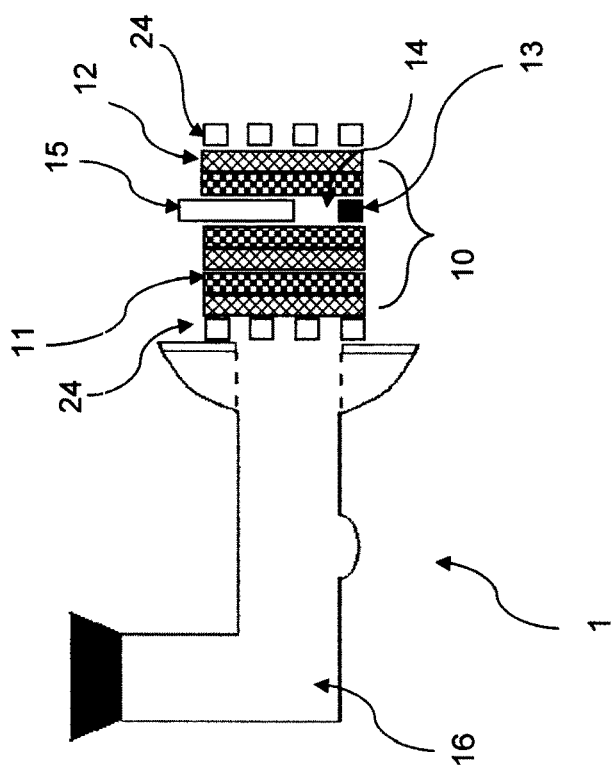

According to a first embodiment and referring to FIGS. 1a and 1b, a membraneless direct liquid fuel cell 1 comprises a membraneless electrode assembly 10 having a fluid permeable anode electrode 11 comprising a porous layer that has an outer face and an opposite inner face that faces an inner face of a cathode electrode 12. Located between the anode electrode 11 and cathode electrode 12 is a spacer guard assembly 13 which comprises a frame that contacts the periphery of the anode electrode 11 and cathode electrode 12 and serves to space the anode electrode 11 and cathode electrode 12 apart from each other, as well as to define an inner electrolyte chamber 14 in between the anode electrode 11 and cathode electrode 12. The spacer guard assembly 13 frame also serves as a fluid barrier in the lateral direction so that liquid electrolyte is contained in the electrolyte chamber 14. Spacing the electrodes 11, 12 from each other also prevents the electrodes 11, 12 from touching and short circuiting.

A fuel reservoir 16 on the anodic side of the fuel cell 1 is fluidly coupled to the outer face of the anode electrode 11 and contains a liquid fuel/electrolyte solution. The outer face of the cathode electrode 12 is open to air which serves as the oxidant in the fuel cell reaction. The electrolyte chamber 14 and the anode electrode 11 are initialized with an aqueous liquid electrolyte. During normal fuel cell operation, when the fuel/electrolyte is supplied to the outer face of the anode electrode 11, the fuel permeates through the anode outer face and is preferably substantially completely oxidized within the body of the anode electrode 11, such that substantially no fuel passes the inner face of the anode porous layer into the inner chamber 14. However, the anode electrode 11 can be designed to allow some fuel to crossover to the cathode electrode 12, so long as the amount of crossover is low enough not to reduce the performance of the fuel cell 1 below a useful amount.

The liquid electrolyte is an ion conducting medium that provides ionic communication between the anode and cathode portions of the fuel cell 1. This communication allows the transport of ions (in this case, protons) from the fuel oxidizing anode electrode 11 to the cathode electrode 12. In the present embodiments, an aqueous solution is used which contains both fuel and the electrolyte. A suitable liquid electrolyte is sulfuric acid; however the electrolyte medium may be any of a number of media that allow ionic conduction. The electrolyte medium may be acidic or alkaline in nature. A suitable fuel is methanol; however, the fuel can be an electroactive alcohol, electroactive organic acid, or an electroactive ether. More particularly, the fuel can be selected from the group consisting of propanol, methanol, formic acid, acetic acid, borohydride, ethanol, dimethylether, dimethoxymethane, trimethoxy methane, Trioxane, or other fuels suitable for oxidation in a direct fuel cell. The fuel can be in aqueous solution or be non-aqueous; for example, the fuel can be 100% formic acid. One suitable fuel/electrolyte solution for use with the fuel cell 1 is 5 M methanol & 0.5M $H_2SO_4/H_2O$ solution.

In this embodiment, the fuel cell 1 uses air as a gaseous oxidant. While air breathing fuel cells offer a simple oxidant source, the oxidant is not restricted to ambient air, and can be other suitable oxidants as are known in the art, including oxygen, hydrogen peroxide, organic peroxides, chlorine, etc.

Catalyst particles, selected to effectively promote the oxidation of the fuel, are distributed between the outer and inner surfaces inside the anode electrode 11. The catalyst particles may be distributed substantially uniformly throughout the thickness of the porous layer between the anode's outer and inner surfaces, or may be distributed non-uniformly, for example in discrete layers or regions. Sufficient catalyst is provided so that a sufficient amount of fuel is reacted in the anode electrode 11 for useful voltage output by the fuel cell 1. The thickness of the anode electrode 11 and the quantity of catalyst required will depend for example on the amount of fuel supply to the anode electrode 11 and the rate of fluid transport through the anode electrode 11 and the rate of fuel consumption in the anode electrode 11. In one example of the anode electrode 11, a porous material is provided comprising one or more layers of carbon particles mixed with a polymeric binder, and catalyst particles are distributed throughout the porous material (FIGS. 1(a) and (b) show a multiple layered anode electrode 11). The porous material can be a carbon substrate (e.g. cloth, felt, paper) and a matrix of carbon particles and a polymeric binder which, along with the catalyst particles is distributed throughout the thickness of the carbon substrate. The porous layer has properties that provide sufficient strength and rigidity to serve as a support structure for the anode electrode 11, given that the electrolyte chamber 14 results in an unsupported gap between the active areas of the anode electrode 11 and cathode electrode 12. The anode structure can incorporate a lateral diffusion barrier which prevents or impedes fuel from flowing laterally through the anode.

Similar to the anode electrode 11, the cathode electrode 12 comprises a porous layer having properties that provide sufficient strength and rigidity to serve as a support structure for the cathode electrode 12, given that there is no membrane support structure between the anode electrode 11 and cathode electrode 12 in this embodiment. The cathode porous layer is loaded with catalytic material that serves to catalyze the oxidant (oxygen in air) as required by the electrochemical reaction. The cathode structure can incorporate a lateral diffusion barrier which prevents or impedes oxidant from flowing laterally through the cathode.

Referring to FIGS. 2a and 2b, the spacer assembly 13 (see FIGS. 1a and 1b) further comprises a guard assembly 17 comprising a frame with a movable guard 15 located in between the anode electrode 11 and cathode electrode 12 and which is movable into and out of the electrolyte chamber 14. The spacer assembly 13 has sufficient seals to ensure that there is no fluid leakage between the spacer assembly 13 and the anode electrode 11 and cathode electrode 12, and within the guard assembly 17. The guard 15 is a solid plate which can be lowered into the electrolyte chamber 14 to sever part or all of the ionic contact between the anode electrode 11 and cathode electrode 12. The guard 15 in this embodiment is made from an insulating material that does not substantially soak in or absorb the electrolyte solution sufficiently to provide a path for ionic conduction. Some examples of suitable materials for the guard 15 include plastic (PTFE), glass (borosilicate) or ceramic.

Referring to FIGS. 2a and 2b, the guard 15 is vertically slidably mounted within the frame of the guard assembly 17, and is attached to a top arm of the guard assembly 17 by a rotatable threaded rod 18. The rod 18 is connected to the arm of the guard assembly 17 such that the rod 18 can freely rotate within the hole. The rod 18 threadably extends through a threaded bore 19 in the guard 15 such that rotation of the rod 18 relative to the bore 19 causes the guard 15 to move up and down in the guard assembly 17. A actuator 20 (shown schematically in FIGS. 2a and 2b) is rotatably coupled to the rod and is controlled by a programmable controller 22 having a memory programmed with a guard control algorithm as will be described in more detail below. The actuator 20 can be a motor or a solenoid valve or other controllable movement means as known in the art. Alternatively, the actuator 22 can be operated manually by a user instead of by a programmable controller. In yet another alternative embodiment, the rod 18 can be manually rotated instead of by an actuator.

Optionally, an electrode diffusion barrier 24 can be positioned between the fuel reservoir 16 and anode electrode 11. The electrode diffusion barrier 24 serves to control the fuel flux to the anode electrode 11. The electrode diffusion barrier 24 is made from perforated graphitic material, and serves the dual purpose of current collection and the control of methanol flux. An advantage of using a flexible graphitic sheet is that its physical characteristics such as thickness, pore size, shape and distribution can be controlled in a known way. In this way, various transport schemes can be designed. Although graphitic sheets are used in this embodiment, other perforated materials can also be used, such as a perforated metal foil. Alternatively, the electrode diffusion barrier 24 can be made from any perforated material and can be either electrically conductive and insulating. When electrically conductive, the diffusion barrier 24 can act as a current collector for the fuel cell 1. Optionally, a second electrode diffusion barrier 24 can be positioned over the outer surface of the cathode electrode 12.

Referring to FIGS. 3a-3c, power output of the fuel cell 1 (see FIGS. 1a and 1b) can be controlled by controlling movement of the movable guard 15. More particularly, all or part of the active area in the electrode assembly 10, which are herein defined as the electrocatalyst-bearing outer or inner faces of the anode electrode 11 (see FIGS. 1a and 1b) and cathode electrode 12 (see FIGS. 1a and 1b) exposed to the reactants and/or electrolyte (hereinafter referred to as "maximum potential active area") can be blocked by the guard 15. In this embodiment, the guard 15 is inserted in between the anode electrode 11 (see FIGS. 1a and 1b) and cathode electrode 12 (see FIGS. 1a and 1b) to block the ionic connection between the electrodes 11, 12. In other embodiments as will be described later, the guard 15 can cover one or both of the outer surfaces of the anode electrode 11 and cathode electrode 12 thereby blocking reactants from reaching the respective outer surfaces electrodes 11, 12, and impeding the reactants from reaching the active areas within the electrode body behind the blocked surfaces. That is, some reactant that flows into the electrode body through the unblocked electrode surfaces may permeate laterally into the electrode body, the amount of permeated reactant tends to be minimal with selection of an appropriate electrode geometry and can be reduced by incorporating lateral diffusion barriers into the electrode body. In this FIGS. 3a-3c, the maximum potential active area of the electrode assembly 10 is represented by the circle, which corresponds to the electroactive anode and cathode outer or inner surfaces that are exposed to the reactants and/or electrolyte, and the guard 15 is represented by the square. In the areas of the electrode assembly 10 which are not blocked by the guard 15, the active nature of the fuel cell 1 (see FIGS. 1a and 1b) remains (as shown in FIG. 3(a)). However, in the surface areas which are blocked by the guard 15 (as shown in FIG. 3(b)) and the region of the electrode body behind the blocked surface area, the reactivity is substantially reduced or prevented. As the deactivated regions possess limited reactivity for the reaction of the fuel cell 1 (see FIGS. 1a and 1b), the contribution to the overall power output from the deactivated regions is limited, and thus the total power output of the fuel cell 1 is reduced. For the embodiment shown in FIGS. 1a 1b, ionic contact between anode electrode 11 and cathode electrode 12 is completely severed when the guard 15 covers the entire maximum potential active area (as shown in FIG. 3(c)), thus resulting in substantially no power output from the fuel cell 1.

The unblocked surface area of the electrode surfaces at any given position of the guard 15 is referred to as the "effective active area" of the electrode 11, 12, as this is the area of the electrode 11, 12 which is still substantially electroactive. This effective active area can be changed depending on the load conditions of the fuel cell, and in particular can be changed by the controller 22 in response to varying load condition to optimize the operation of the fuel cell 1.

Operation

The controller 22 is programmed to selectively control the total power output of the direct liquid fuel cell 1 under variable load conditions. In one embodiment, the controller 22 is programmed to vary the effective active area by moving the guard 15 in response to varying load conditions to maintain a substantially constant current density and consequently voltage and power density. Operating at a substantially constant current density offers several advantages: the system is always operating at an optimal point and the electrode assembly 10 design can be optimized to this point. As the fuel consumption and crossover rate per unit area (for example, as mol/cm$^2$ s) is always approximately constant, it allows for the optimization of a single fuel concentration. This is useful for examples that incorporate the membraneless fuel cell approach to ensure the fuel crossover is low. In a conventional cell where the entire active area is always open, changes in power conditions result in a varying current density and consequently different consumption rates per unit area and non-optimized performance.

In another embodiment, the controller 22 is programmed to selectively control the total power output of the direct liquid fuel cell 1 under variable load conditions while operating the fuel cell at a substantially constant voltage. The advantages of operating at a substantially constant voltage include: elimination of damage to electrical components due to large voltage fluctuations; higher DC-DC converter (voltage regulator) efficiency due to closely matched input/output voltages in the system; easier to detect failure modes (e.g., when the voltage of different open areas greatly deviates from the constant value); and less degradation of the fuel cell components and system, which can lead to longer fuel cell lifetimes.

According to another embodiment, the fuel cell 1 can also be used as a failure detection tool. For instance, in a single cell, the voltage should be approximately constant for the different active areas. If there is a large deviation from the expected value, there may be a failure in the open region of the single cell. In addition, the guard 15 can close the affected region, and open a different section to compensate for the failure.

Figure 4A:
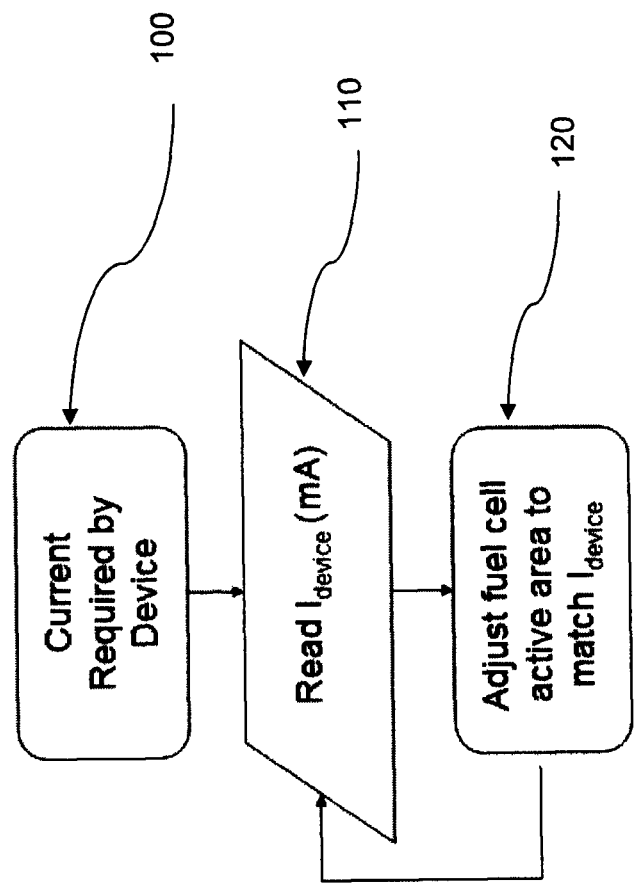
FIGS. 4(a) and (b) are a flowchart and a system diagram of a guard control algorithm programmed into a memory of a controller of an ideal fuel cell system.
Figure 4B:
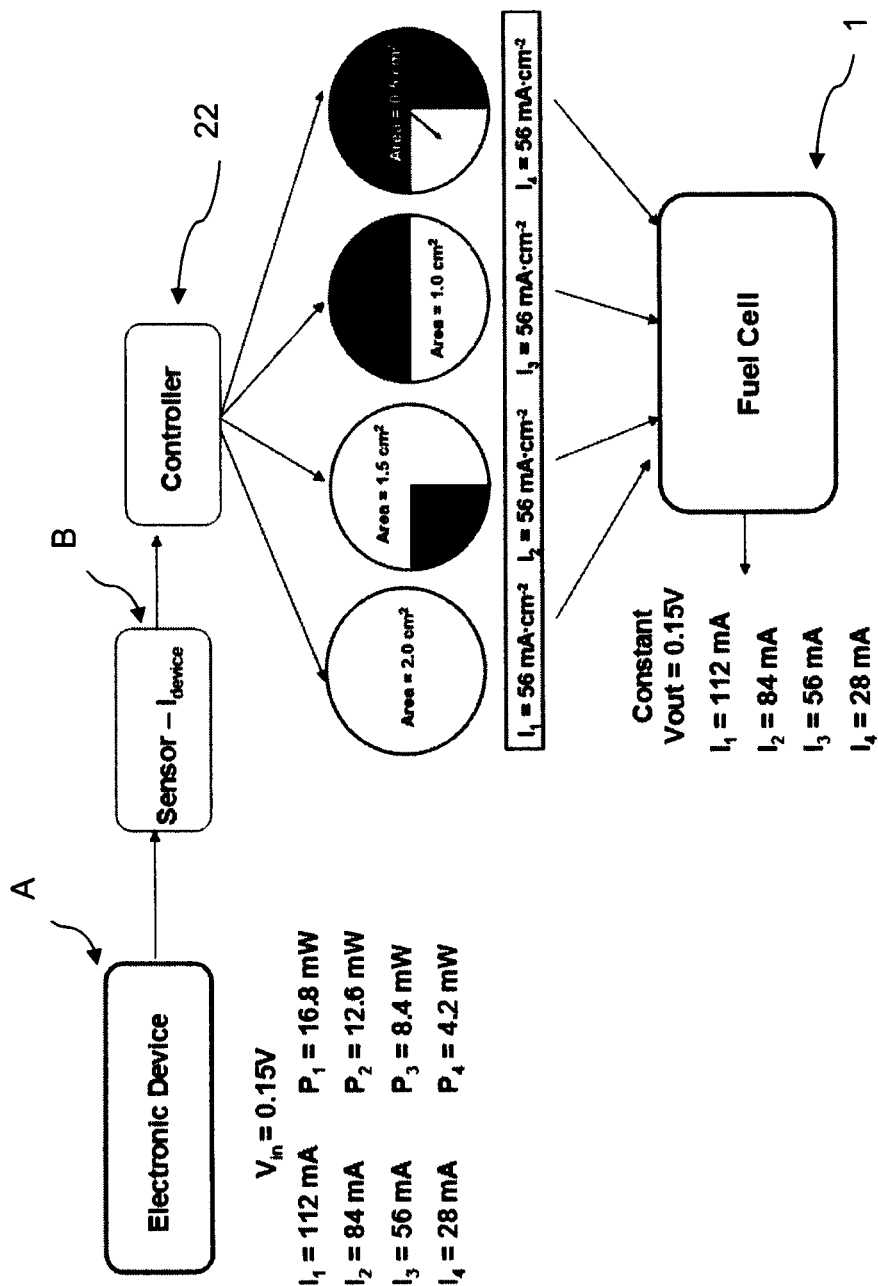

Referring to FIGS. 4(a) and 4(b), an exemplary control algorithm is programmed into the memory of the controller 22 for an ideal case where there is a direct 1:1 proportionality between the active area and power. Under non-ideal conditions, other components (e.g. DC-DC converter) and a more complicated control logic may be required. The algorithm is executed by the controller 22 as a series of steps of instructions, comprising at step 100: first an electronic device A is electrically coupled to the fuel cell 1 and draws a load during operation. Then, at step 110, a current sensor B reads the desired current $I_{device}$ from the device A. Then at step 120, based on load read by the sensor, the controller 22 determines the position of the guard 15 that would provide the effective active area that causes $I_{device}$ to equal the required current. Determining the appropriate position of the guard to obtain a desired current can be carried out as follows:

1. Develop a polarization curve and decide on the desired current density and voltage for the fuel cell 1. E.g 56 mA/cm$^2$ and 0.15V. This polarization curve can be stored in the memory of the controller 22.
2. If necessary, connect multiple fuel cells 1 in parallel to accommodate the electronic device input voltage. In general, electronic devices are designed for a constant voltage input. The power of the device changes according to the load.
3. Determine the maximum absolute current of the device A, e.g. 112 mA. Using the desired current density obtained in step #1, determine the active area required. For example, assuming a current density is 56 mA/cm$^2$ is chosen, a 2 cm$^2$ active area is required for each cell.

The control logic is applied in the following example, with reference to FIG. 4(b)
1. Assume the device A requires a constant 0.15V. Also assume the current required by the device can change from 112 mA to 84 mA to 56 mA to 28 mA ($I_1$ to $I_4$). This results in corresponding power requirements of 16.8 mW, 12.6 mW, 8.4 mW, and 4.2 mW ($P_1$ to $P_4$)
2. The sensor B reads the change in absolute required current (mA) and sends it to the controller 22.
3. The controller 22 adjusts the active area of the fuel cell 1 to maintain the designed current density of 56 mA/cm$^2$. (e.g., 84 mA÷56 mA/cm$^2$=1.5 cm$^2$; 56 mA÷56 mA/cm$^2$=1 cm$^2$ etc.)
4. On an absolute basis (mA) the fuel cell output will match the current required by the device A. As a consequence of maintaining a constant current density (mA/cm$^2$) for different effective active areas, the voltage will be constant.
5. The sensor B continues to monitor the current required and sends the information to the controller 22 and the process is repeated.

Other Embodiments

The guard 15 in the embodiment shown in FIGS. 1a to 4b is only one type of a suitable adjustable barrier means that can be used to mitigate or prevent the presence of one or more phases of the TPB in a selected region of the fuel cell 1. As noted above, the adjustable barrier means serves to limit or disrupt the access of one or more of the fuel, electrolyte or oxidant to selected electrocatalyst-bearing regions (active areas) of the fuel cell 1.

FIGS. 5(a) to (g) show representative schematic examples of alternate embodiments of the fuel cell 1 that feature one or more guards 15 in different locations in the fuel 1. In particular, the guard 15 can cover a portion of the: a) anode active surface area as shown in FIG. 5(a), b) area within the open spacer assembly 13 as discussed above and shown in FIGS. 1a and 5(b), c) cathode active surface area as shown in FIG. 5(c). Or, the fuel cell 1 can comprise one or more guards 15 in any combination as shown in FIGS. 5(d)-(g) to create an effective active surface area of the electrode 11, 12 that is less than the maximum active surface area of the electrode 11, 12. In some cases where a guard 15 is present at the anode electrode 11 and/or spacer assembly 13, crossover can also be prevented in the covered area under variable operation. Note that FIGS. 5(a), 5(c) and 5(g), wherein the guard or guards 15 are on the outer face of the anode electrode 11 and/or cathode electrode 12 are depicted as membraneless fuel cells, this should not be considered limiting as the embodiment will also work where there is a membrane in place of the spacer assembly 13.

Figure 5:
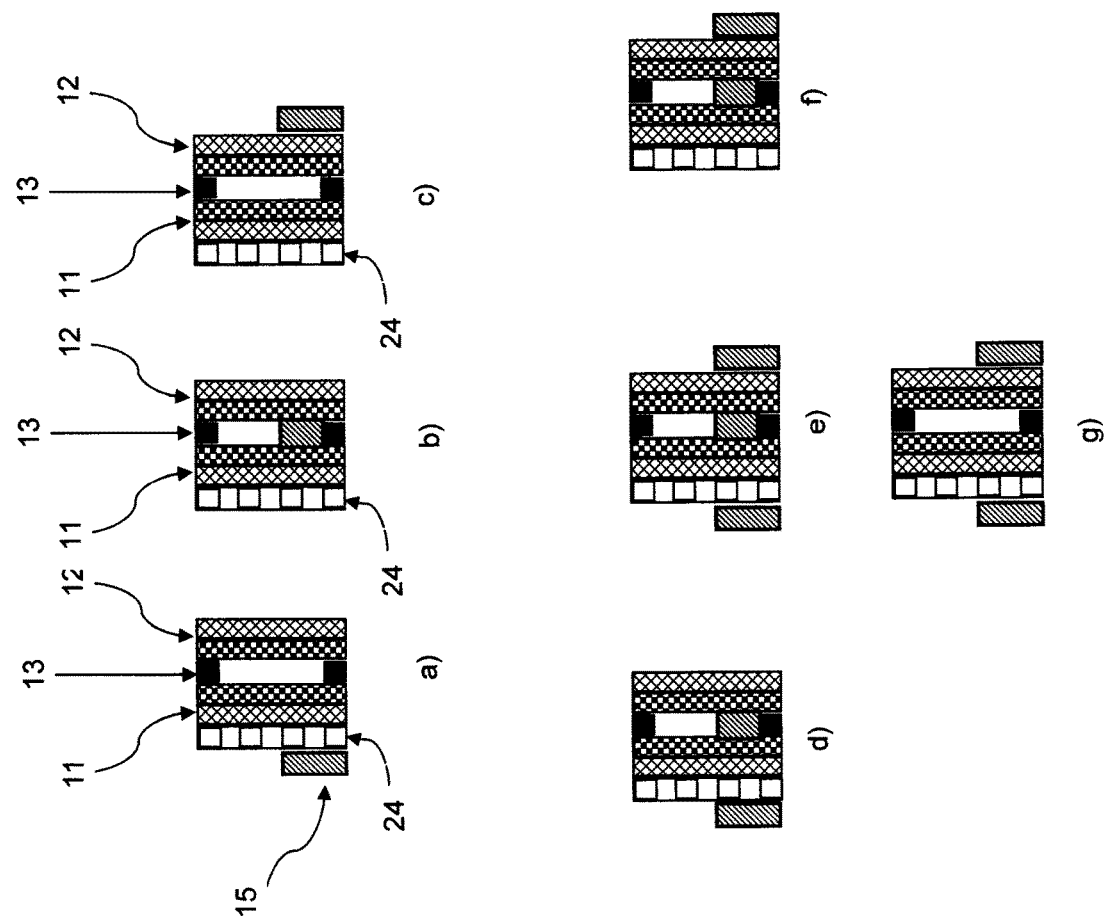
FIGS. 5(a) to (g) are schematic sectional side views of seven different embodiments of the movable guard in the fuel cell.

While examples are shown in FIG. 5 in which a diffusion barrier 24 is optionally present at the anode side of the electrode assembly 10, it is not a required component of the fuel cell 1. The diffusion barrier 24 may be preferred in some embodiments; in these embodiments, the guard 15 can be a perforated plate having perforations that are alignable with openings in the diffusion barrier 24.

As shown in the examples in FIGS. 5(a)-(g), when guards 15 are used to deactivate more than one area of the electrode assembly 10—for example in FIG. 5(g) where one guard 15 is used to deactivate an area at the anode electrode 11 while another is used to deactivate an area at the cathode electrode 12—the guards 15 are preferably aligned so that they substantially overlap as viewed in the direction of the fuel flow through the electrode assembly 10.

Fuel cells which comprise the movable guard need not be planar. The guard(s) used to deactivate active surface areas of a fuel cell can be chosen such that they sufficiently match the general shape and/or surface contour of the appropriate surfaces upon which they act in order to provide interruption of the TPB. Examples include a cylindrical fuel cell with guard(s) that are hollow cylinders (or tube-like) in shape such that they match appropriately with the portion of the fuel cell (one example being an anode or cathode) upon which they are to act in order to deactivate an active surface area.

For approaches where the anode and/or cathode surface area is covered, deactivation occurs through the restriction of the reactant and/or electrolyte (for example, methanol, oxygen, acid, etc.) to the catalyst sites. For approaches where the open spacer is blocked, deactivation occurs by mitigating or severing the ionic contact between the anode and cathode, as already described above.

The guard 15 itself can be made from an electrically conductive or insulating material when used to cover the anode electrode 11 and/or cathode electrode 12 and an electrically insulating material when placed between the electrodes 11, 12. A broad range of acceptable materials can be chosen for use as the guard 15, depending on the particular environment (such as fuel, oxidant, electrolyte, temperature, pH, etc.) it will be exposed to in the fuel cell. For example, a guard 15 used for covering the anode electrode 11 and/or cathode electrode 12 may be made from certain metals, plastics, glasses or ceramics. In one embodiment, the guard 15 covering the outer face of the anode electrode 11 and/or cathode electrode 12 may be electrically conductive. In this way, the guard 15 has the dual role of current collection and power control. As stated, a guard 15 to be placed between the electrodes 11, 12 should be made from an insulating material that does not substantially soak in or absorb the electrolyte solution sufficiently to provide a path for ionic conduction—that is, a path for ionic conduction should not be present. Some examples of materials for the guard include plastic (PTFE), glass (borosilicate) or ceramic.

Figure 6B:
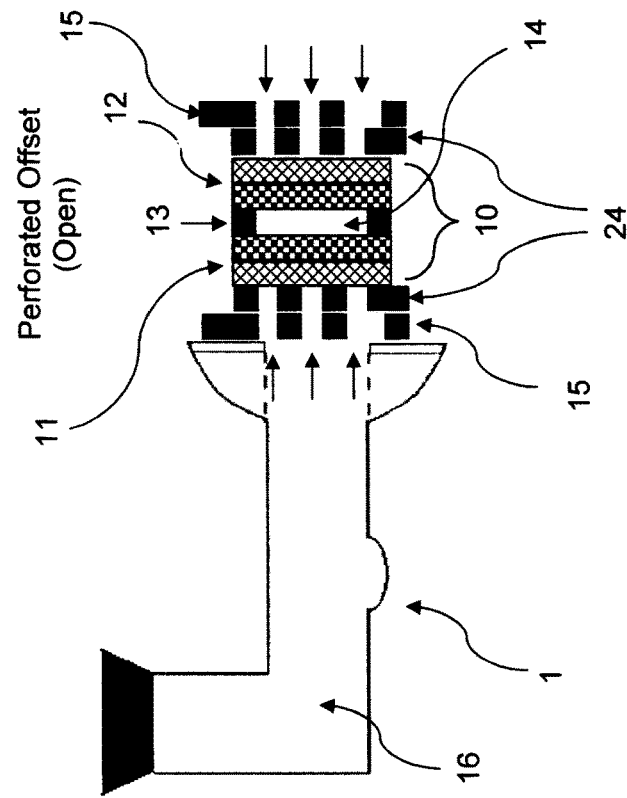
FIGS. 6(a) and (b) are schematic sectioned side views of the membraneless fuel cell with a perforated offset and a movable guard in partially closed (FIG. 6(a)) and opened (FIG. 6(b)) positions, according to another embodiment of the invention.
Figure 6A:
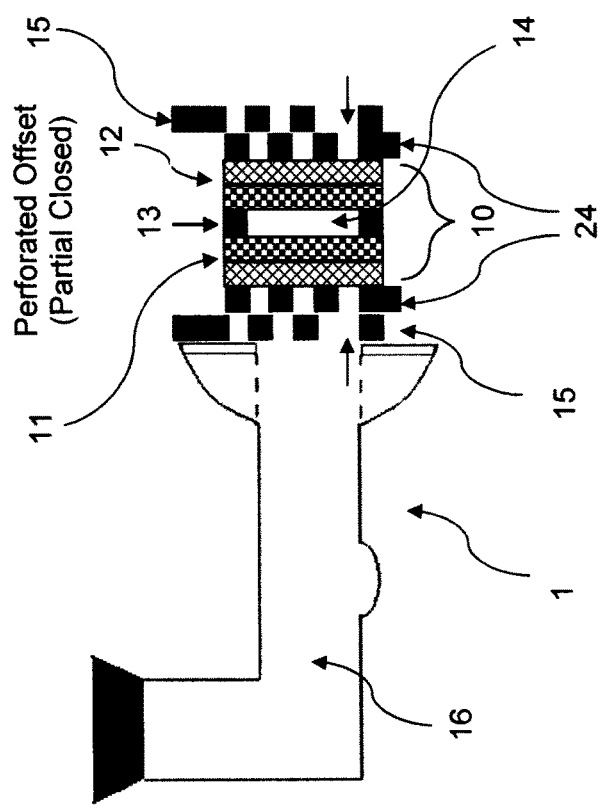
Figure 7B:
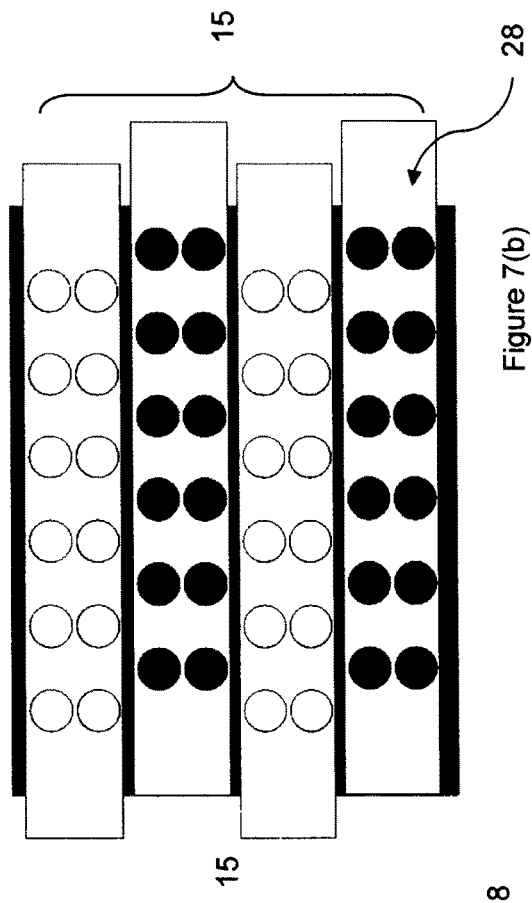
FIGS. 7(a) and (b) are front views of a movable perforated type guard in opened (FIG. 7(a)) and partially closed (FIG. 7(b)) positions according to another embodiment of the invention.
Figure 7A:
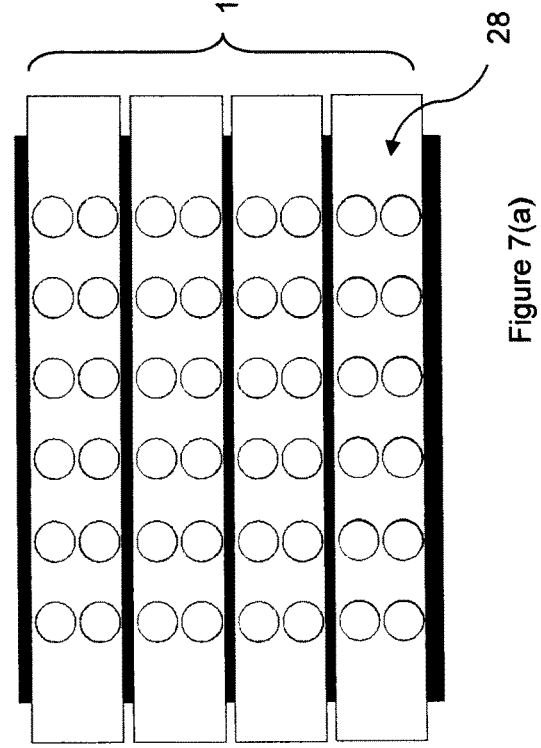

While the guard 15 shown in the first embodiment is a solid plate movable within the spacer assembly 13, the guard can have other configurations. An example would be to use a perforated plate offset with an integrated diffusion barrier/current collector on the anode electrode 11 and the current collector on the cathode (see FIGS. 6a and 7b). The superimposed perforated guard 15 can shift in order to open/close certain pores in the diffusion barrier 24. The perforated guard 15 can be single plate, or multiple parallel plates 28 as shown in FIGS. 7(a) and (b); a multiple plate design allows more control over which areas of the electrode assembly 10 are blocked. Each plate 28 is connected to and movable by the actuator (not shown), or be manually operated. The action of closing certain active areas is not limited to perforated materials.

Figure 9:
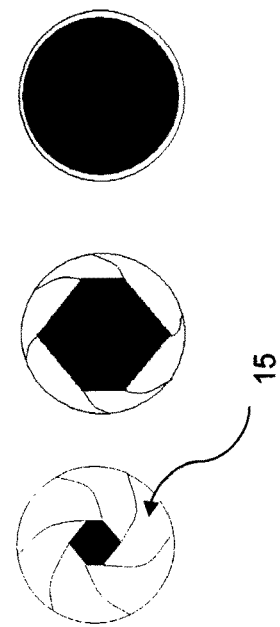
FIG. 9 shows multiple positions of a movable shutter-type guard according to another embodiment of the invention.
Figure 8:
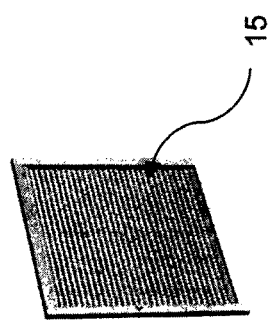
FIG. 8 is a schematic perspective view of a movable shutter-type guard according to another embodiment of the invention.

Other alternative guard designs can be used, such as a shuttered gate having multiple movable parallel slats as shown in FIG. 8, or a diaphragm shutter having multiple movable thin blades as shown in FIG. 9.

Instead of the open spacer assembly 13 with a single opening between the anode electrode 11 and cathode electrode 12 as shown in FIGS. 1a to 4b, an alternative embodiment uses an electrically non-conductive porous separator which consists of a plurality of openings. Such a porous separator can be, for example, bars or a grid that extends across the node and cathode surfaces. An exemplary design of such a porous separator 30 is shown in FIGS. 10a and 10b. Such a porous separator 30 can be used to provide a lateral diffusion barrier to further restrict activation of areas that have been deactivated by the guard due to lateral diffusion, while maintaining the high ionic conductivity of a substantially open spacer. In the example shown in FIGS. 10a and 10b, when the guard 15 is not present, the fuel cell 1 has two active areas (the two open halves of the separator 30) which can provide a power output. When the guard 15 is deployed so as to cover the bottom half of the separator 30, only one active area (top half) of the fuel cell 1 can provide power output, and the deactivated area (bottom half) does not contribute significantly to the power output of the fuel cell. In this example, the total power output is reduced by approximately 50% when the guard 15 is deployed as described.

Other examples of a porous separator can be filter paper, glass filters or frits, expanded plastics etc. These porous separator with a plurality of openings can also be used to further limit the lateral diffusion of reactants and/or electrolyte in the spacer area between the anode and cathode, to allow for a greater restriction of the access of the reactants and/or electrolyte to the deactivated areas compared with an open spacer having a single large opening. The reduced mass transfer present in these porous spacers versus a single opening in an open spacer can aid in the deactivation of selected areas of the fuel cell. In addition, a means to control the lateral diffusion within the electrodes 11, 12 may optionally be used. For example, lateral diffusion within a carbon fiber paper based anode structure may be controlled by the presence of added materials in the matrix such as silicone, epoxy etc.

The movable guard can be used with a variety of fuel cell electrode assembly structures, including those having a membrane electrode assembly, e.g. PEM type, as well as those having a membraneless electrode assembly as described above. In other embodiments of the invention, a fuel cell having a movable guard comprises a conventional solid electrolyte material such as a PEM in a conventional membrane electrode assembly (MEA) (not shown). In embodiments having a PEM or similar material to provide ionic conduction, an electrolyte solution is not necessarily required for operation of the fuel cell, in contrast to the other embodiments described for the membraneless fuel cell. In embodiments incorporating a PEM or similar MEA types, the guard used to controllably alter the effective active surface area of the fuel cell can be present at the anode, the cathode, or both in which case two guards would be used.

The guard can be used to selectively control the effective active area of the fuel cell 1 from 0% to 100% of the maximum potential active area of the electrode assembly 10. In some embodiments it may be desired to control the effective active area of the fuel cell to only a limited range, rather than the entire range, of the maximum potential active area. For example, it may be desired to control the effective active area to 0-90%, or 0-75% or 5-90%, or 5-75% of the maximum potential active area. When the guard is used to control the effective active area of the fuel cell to 0% of the maximum potential active area, this has the effect of "turning off" the fuel cell, which also provides an advantage of limiting or preventing fuel crossover on shut-down. The guard may be configured to allow gradual changes in the effective active area of the fuel cell. The guard may be configured to allow step-wise changes in the effective active area of the fuel cell.

EXAMPLES

The following examples are provided to aid in the illustration and description of the embodiments of the invention, without meaning to limit the invention to the materials or methods described in these examples. It should be understood that these examples are illustrative and should not be considered limiting with respect to the spirit or scope of the invention. Furthermore, alternative embodiments and means of practicing the invention will become clear to one skilled in the art by these representative examples.

Electrode Assembly Preparation

Sheets of perforated graphitic foil, supplied by GrafTech International Ltd., were cut into samples with a 25 mm diameter for use as a diffusion barrier at the anode side. The foil also acts as a current collector. The electrodes were prepared by a spray deposition method using an AccuSpray spray gun. For both the anode and cathode electrodes, a sheet of Etek-TGPH-060 carbon fibre paper with 20% wet proofing was used. On the anode, a loading of 4 mg·cm$^{-2}$ carbon supported (Vulcan XC-72) 20 wt % Pt—Ru (1:1 atomic ratio, or a/o) catalyst with a Nafion® ionomer loading of 30 wt % was applied. On the cathode, a loading of 1.36 mg·cm$^{-2}$ carbon supported (Vulcan XC-72) Pt catalyst with a Nafion® ionomer loading of 30 wt % and a 1.00 mg·cm-2 Cabot carbon sublayer with 20 wt % PTFE was applied. From the electrode, smaller samples with a diameter of 16.5 mm were cut out for the electrode assembly holder. Prior to use, the anode was submerged in 0.5 M $H_2SO_4$ and placed in a vacuum oven for 15 minutes to ensure uptake of the electrolyte into the electrode structure.

The membraneless open ring shaped separator was made with Dow Corning Siliastic J-RTV silicone rubber and a curing agent. The spacer has an outer diameter of 25 mm and an inner diameter of 16 mm with thickness of 0.5 mm.

Guard Preparation for Open Spacer and Over the Electrodes

Sheets of Kapton® 100JP from Dupont or a hydrophobic material (e.g, Millipore hydrophobic filter paper, Teflon etc) were used as materials for the adjustable barrier means (or "guard"). The guard was cut into circles with a 25 mm diameter. For the purpose of a simple demonstration of various power levels, the circles were further cut into 25%, 50% and 75% of the total open area.

Fuel Cell Performance Testing

The electrode assembly was incorporated into an electrode assembly holder with a 2.0 cm$^2$ active area. The performance of the air breathing membraneless DMFC was recorded at ambient temperature and pressure (25° C., 1 atm) with a single chamber glass cell. In these examples, an aqueous fuel/electrolyte solution was used. Polarization curves were obtained using a Solartron 1420E Multistat operated in galvanostatic mode.

Guard In Open Spacer

Figure 11:
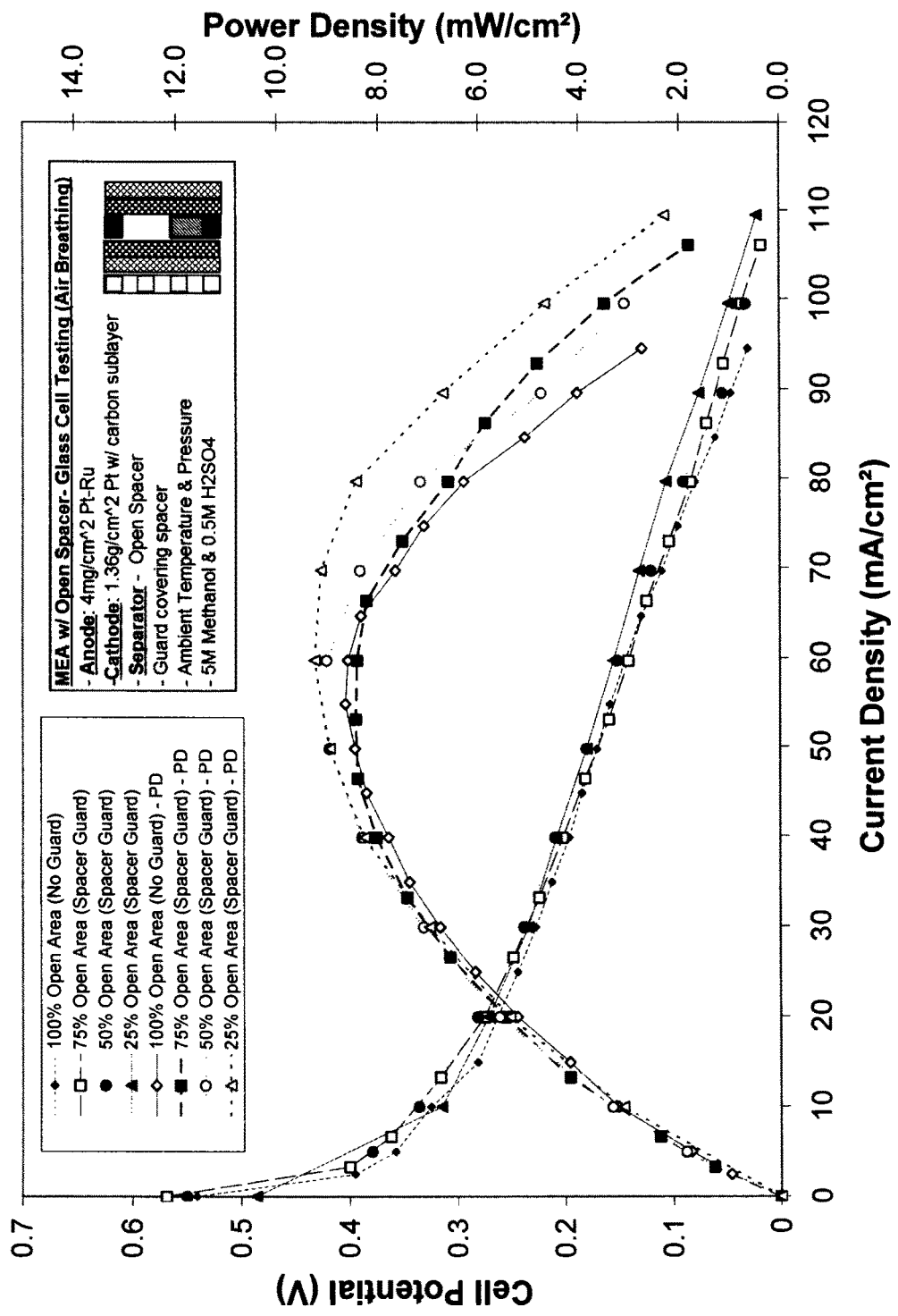
FIG. 11 is a polarization and power curve, normalized to the effective open active area, for an electrode assembly with a guard placed within the open spacer.

FIG. 11 shows the performance, normalized to the open area, of an electrode assembly with a guard in the open spacer (similar in principle to the embodiment shown in FIG. 5(b)). In the segmented section, the anode and cathode are deactivated by ionic isolation. The close similarities in performance for the different open areas throughout the current density range demonstrate that the guard can be effectively implemented to deactivate the covered section. An important aspect to note is that the peak power density occurs at a constant current density value of ~60 mA/cm$^2$ for the varying open area. The advantage of this is that the system is always operating at an optimal point and the electrode assembly can be optimized to this point. The fuel consumption and crossover rate per unit area (mol/cm$^2$ s) is always constant regardless of absolute power output. This allows for the optimization of the fuel cell to a single fuel concentration. In a conventional cell where the entire active area is open, changes in power conditions result in a varying current density and consequently different consumption rates per unit area. The fuel stoichiometry must be adjusted according to the different power levels. In addition, the problem of crossover would increase due to the consumption of less fuel in the anode at low power (i.e., higher concentration reaching the anode/spacer interface).

Constant Voltage

Figure 12:
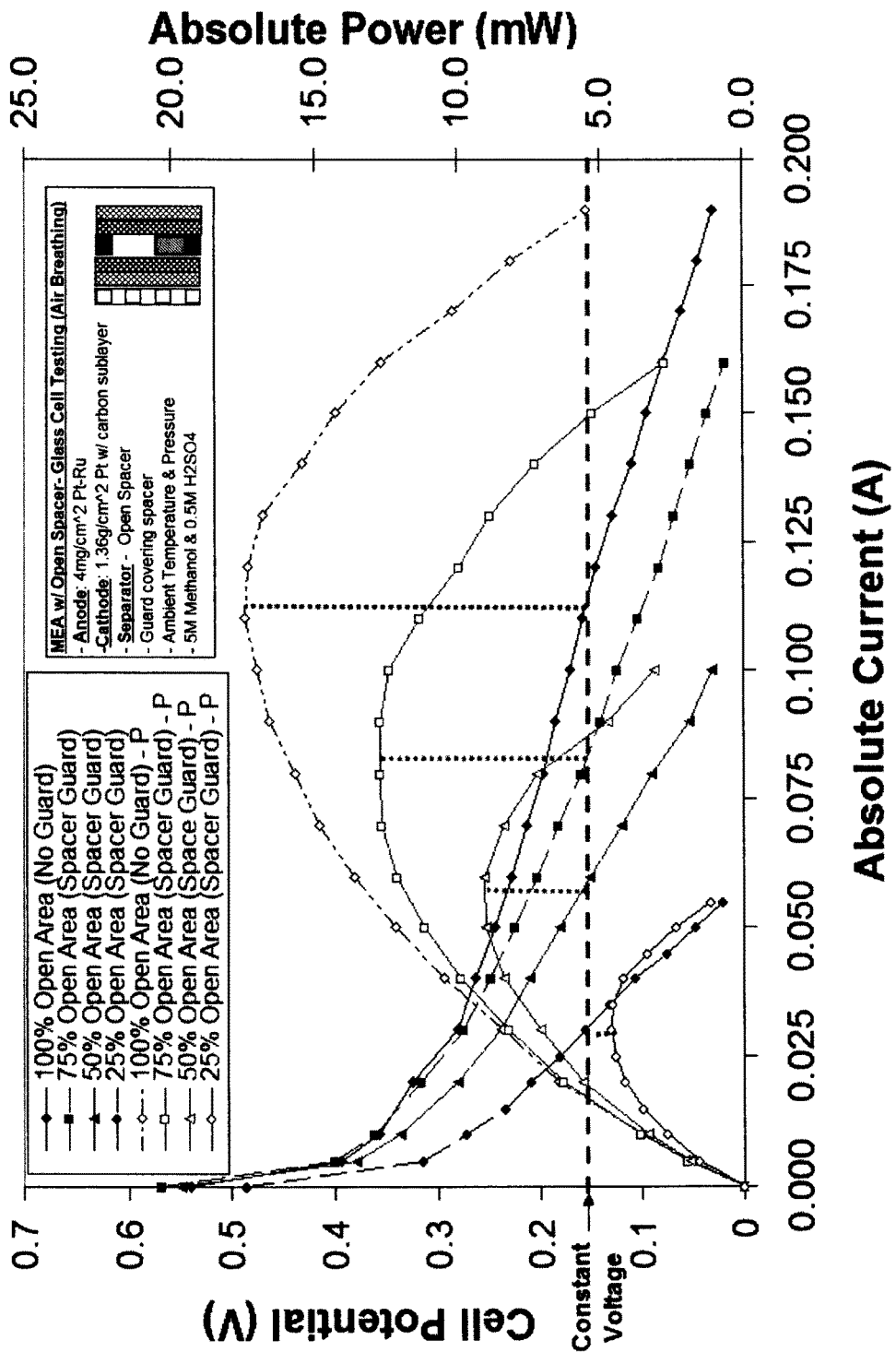
FIG. 12 is a graph of performance and power curves on an absolute basis for various open areas of the exemplary embodiment graphed in FIG. 11.

FIG. 12 shows the performance and power curves on an absolute basis for the various open areas. In this Figure it is noted that at each peak power level, the voltage remains constant at ~0.15V. Advantages of a constant voltage include: the elimination of damage to electrical components due to large voltage fluctuations, higher DC-DC converter (voltage regulator) efficiency due to closely matched input/output voltages, easier to detect failure modes (e.g., when the voltage of different open areas greatly deviates from the constant value), less degradation etc.

Proportional Absolute Power and Absolute Crossover With Open Area

Figure 13:
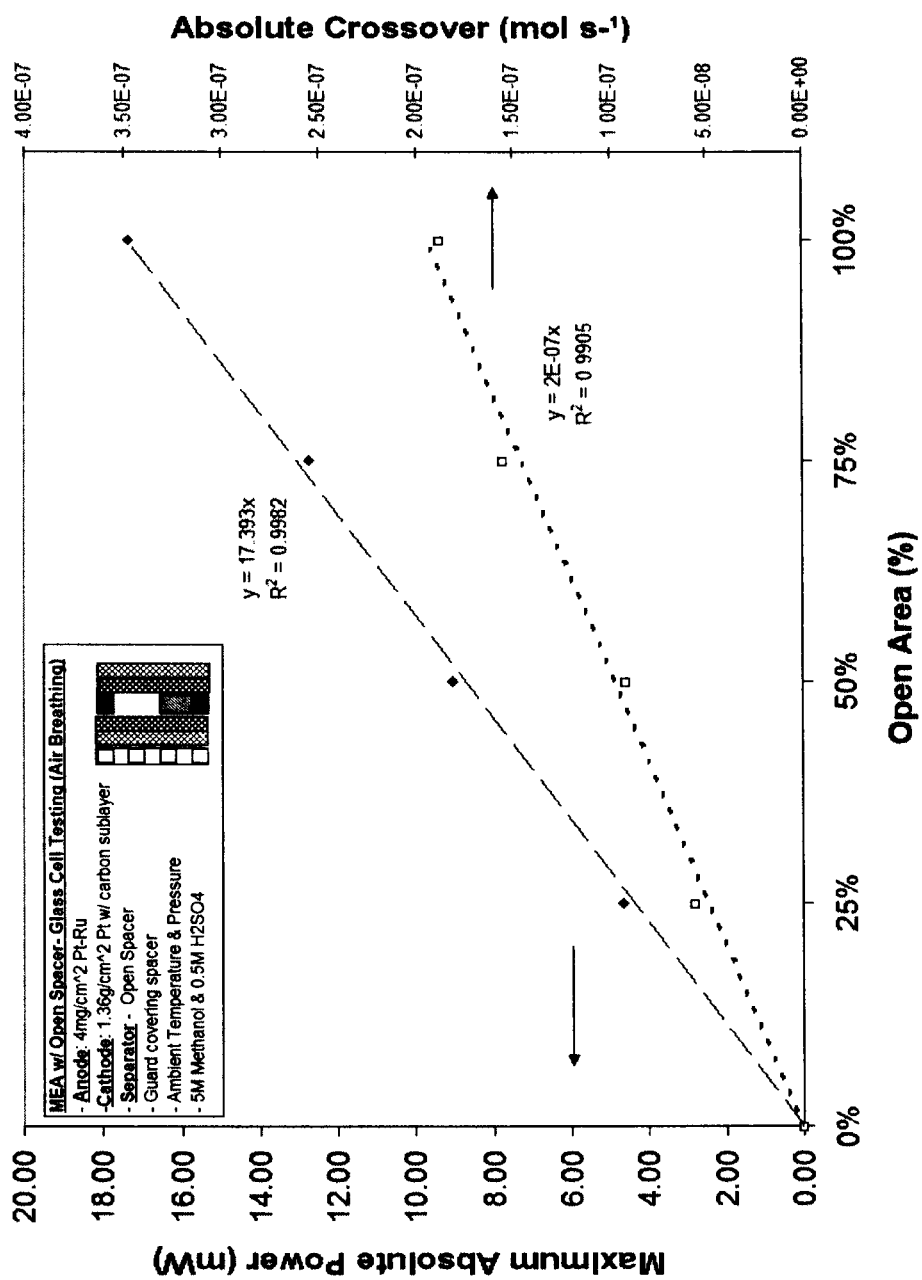
FIG. 13 is a graph of absolute power output and absolute crossover vs. effective active area of the exemplary embodiment graphed in FIG. 11.

FIG. 13 shows that the maximum absolute power and the absolute crossover is proportional to the open area. The linear relationship for the selected open areas shows that the guard effectively deactivated the desired segments of the electrode assembly.

Guard Over Electrodes

Figure 14:
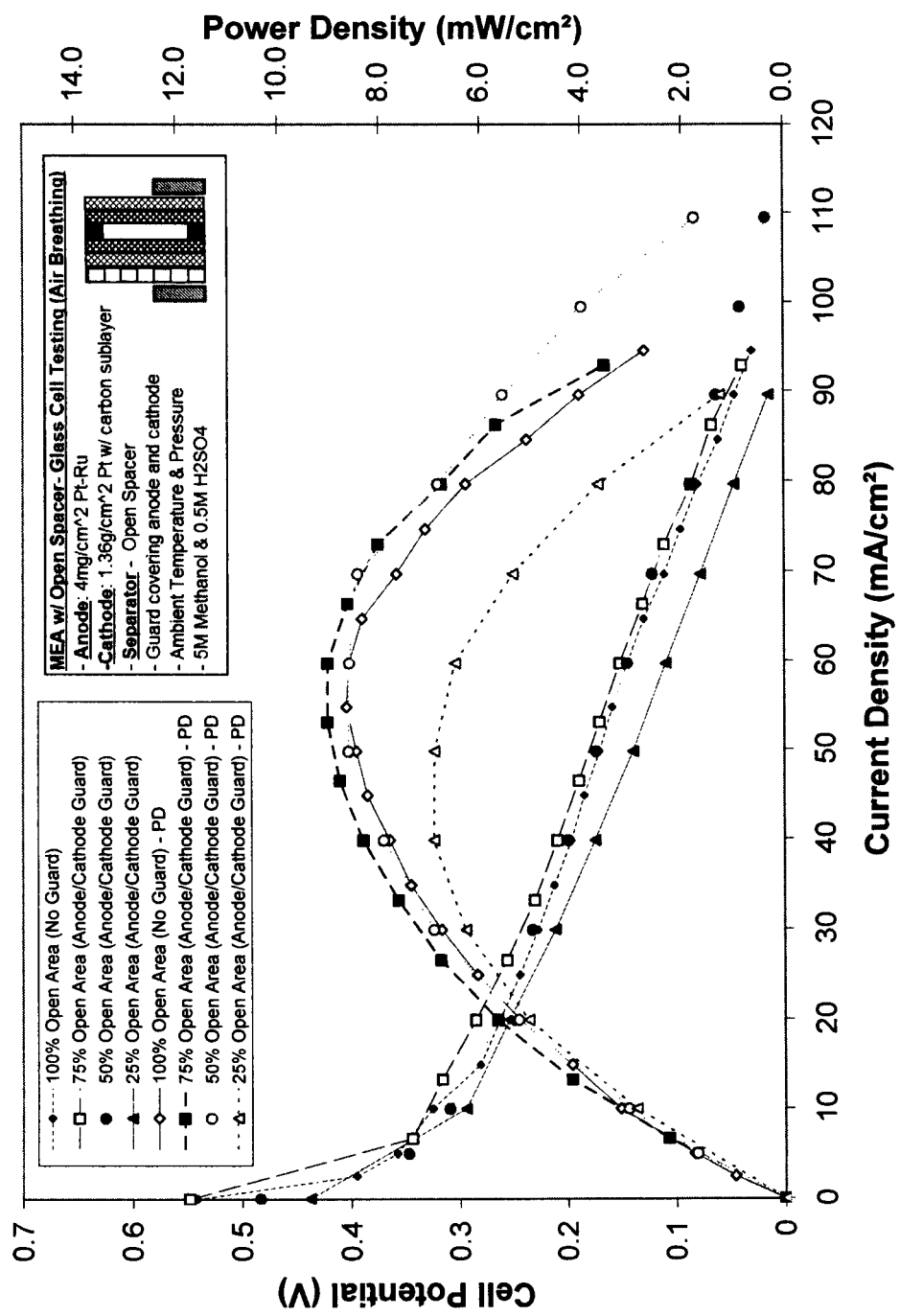
FIG. 14 is a polarization and power curve, normalized to the effective open active area, for yet another exemplary embodiment having a guard covering an anode and a cathode.
Figure 15:
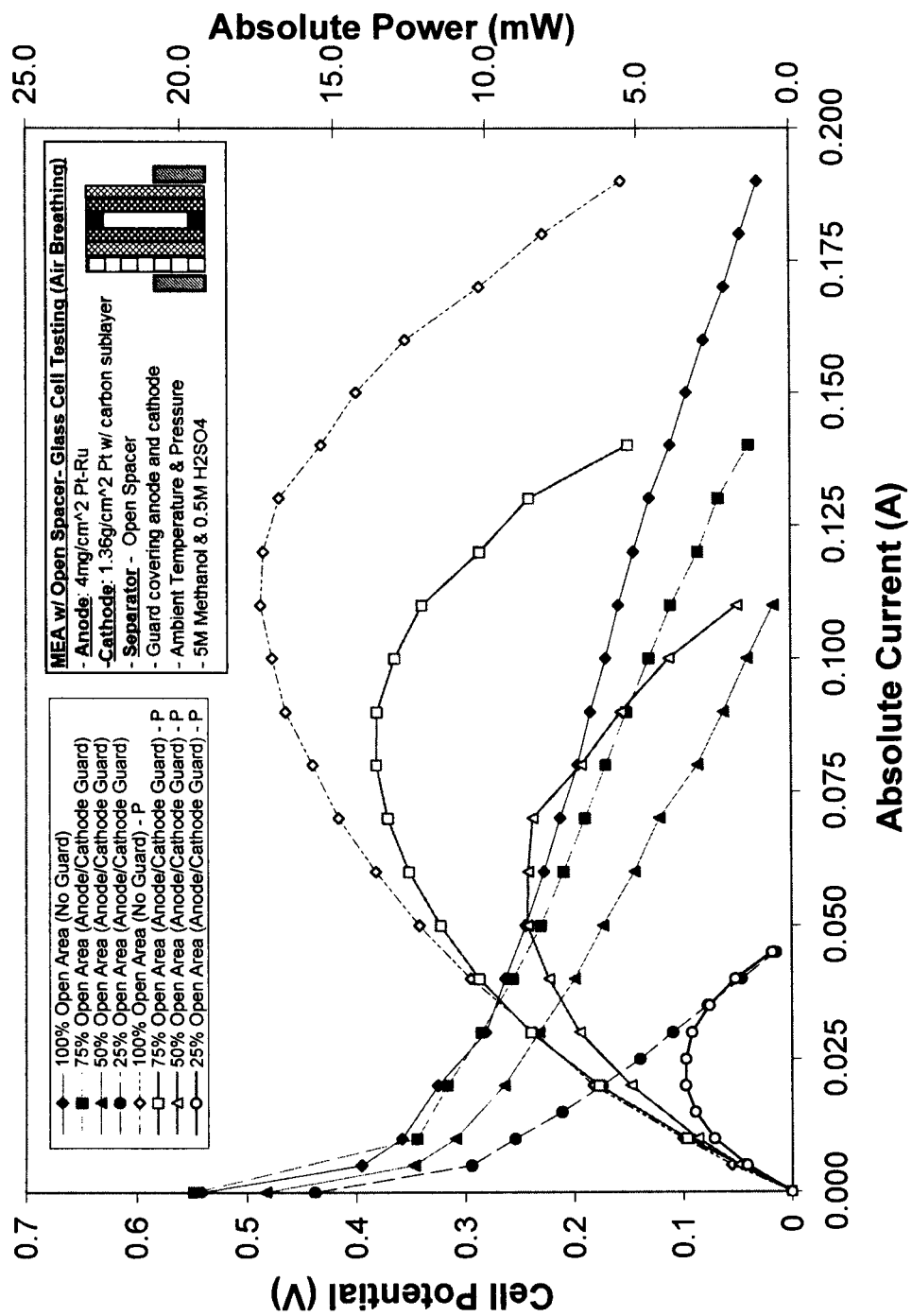
FIG. 15 is a graph of performance and power curves on an absolute basis for various open areas of the exemplary embodiment graphed in FIG. 14.
Figure 16:
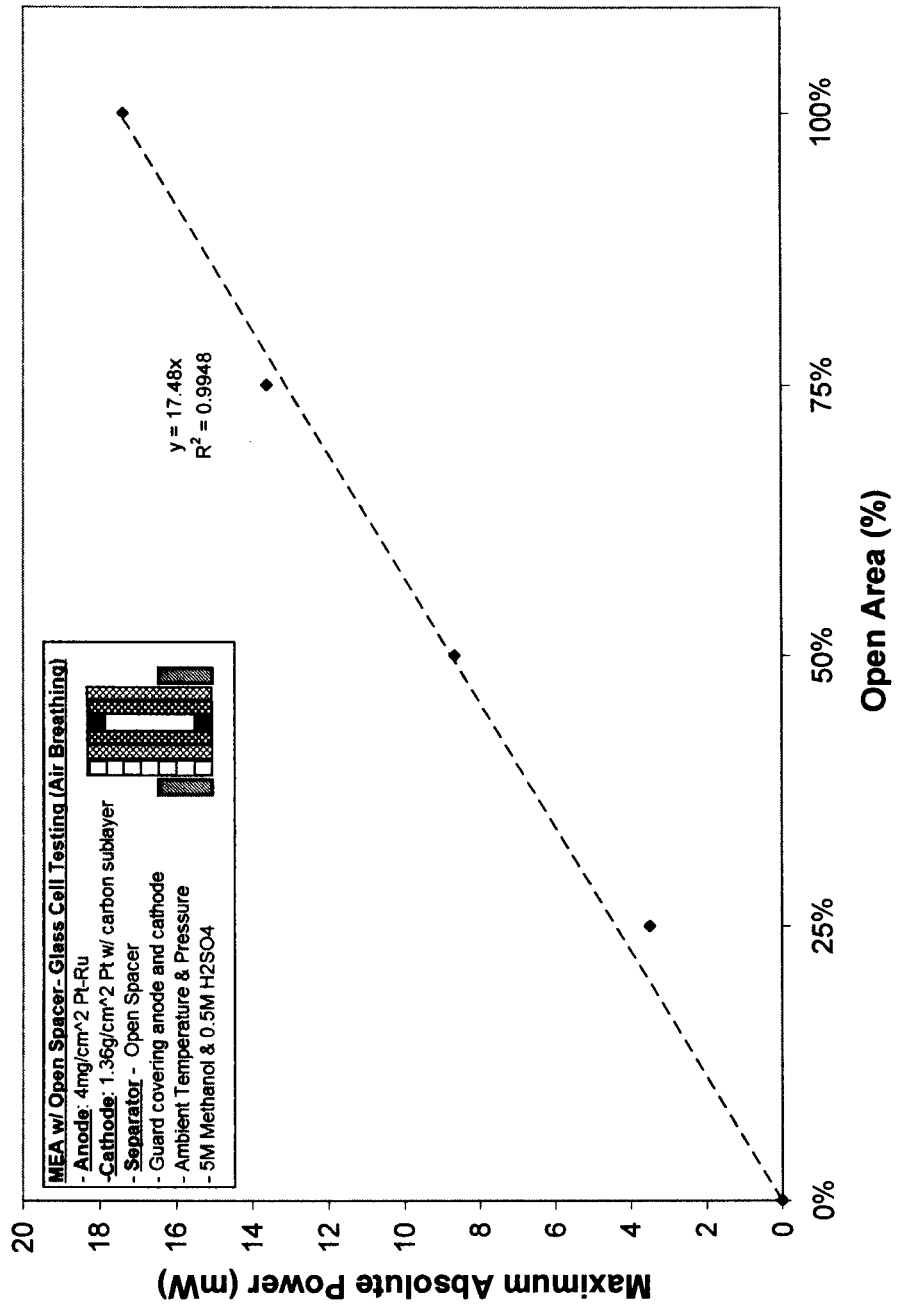
FIG. 16 is a graph of absolute power output vs. effective active area of the exemplary embodiment graphed in FIG. 14.

A fuel cell similar to that described above was assembled, with the guards placed over the anode and cathode, covering the fuel cell active region such that the effective active area was either 75%, 50%, and 25% of the total maximum active area. For comparison, the cell with 100% of the maximum active area exposed was also tested. Representative data are shown in FIGS. 14 to 16

Lateral Diffusion Barrier

Figure 17:
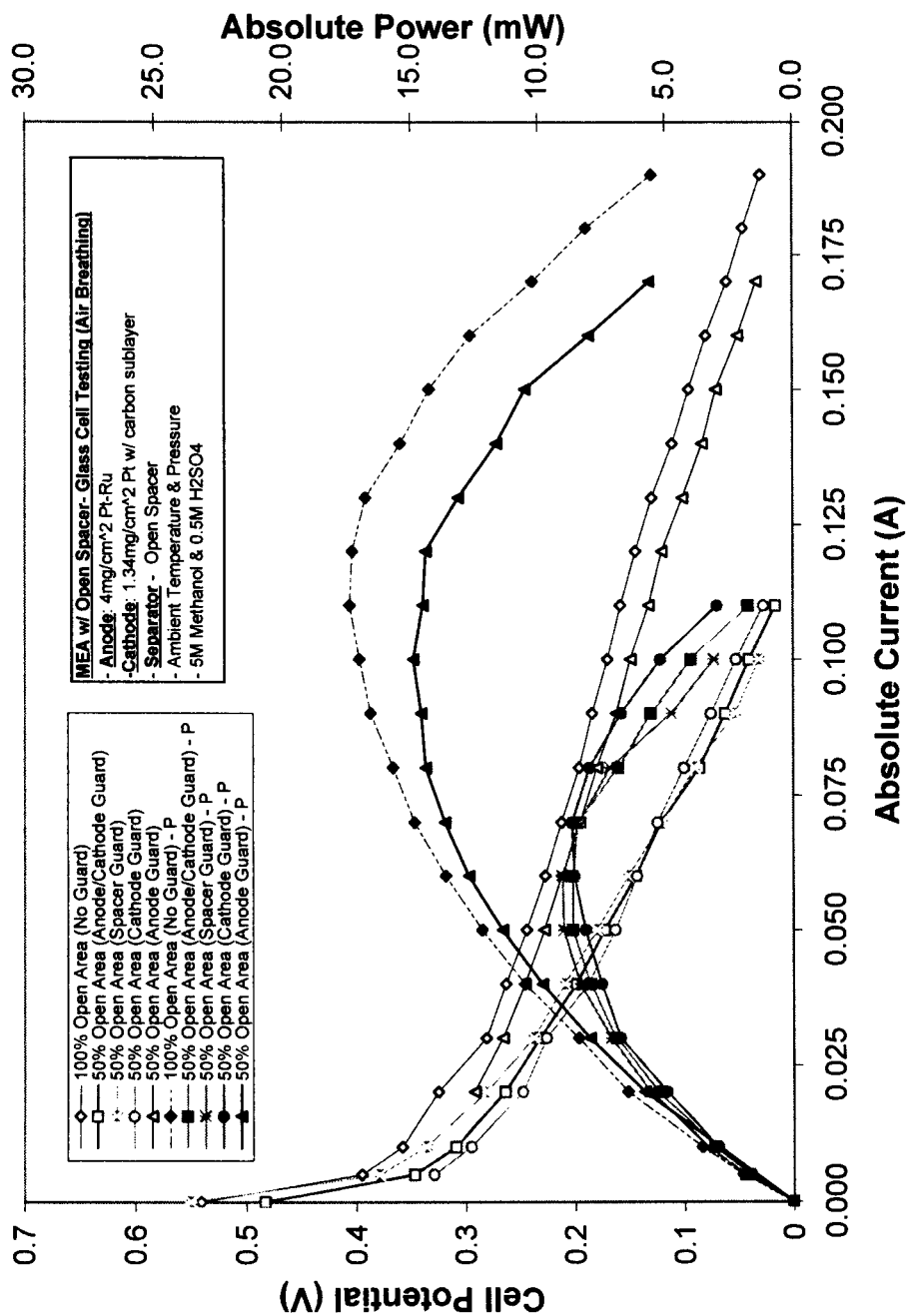
FIG. 17 is a graph comparing the absolute polarization and power curves for the embodiments shown in FIGS. 5(a) to (c) and (g) with a 50% open area.

FIG. 17 is a comparison of the absolute polarization and power curves for configurations a) to c) and g) of FIG. 5 with a 50% open area. All arrangements, with the exception of the case where only the anode was covered (FIG. 5(*a*)), resulted in a reduction of absolute power of approximately 50% versus the baseline case of 100% open area.

Figure 18:
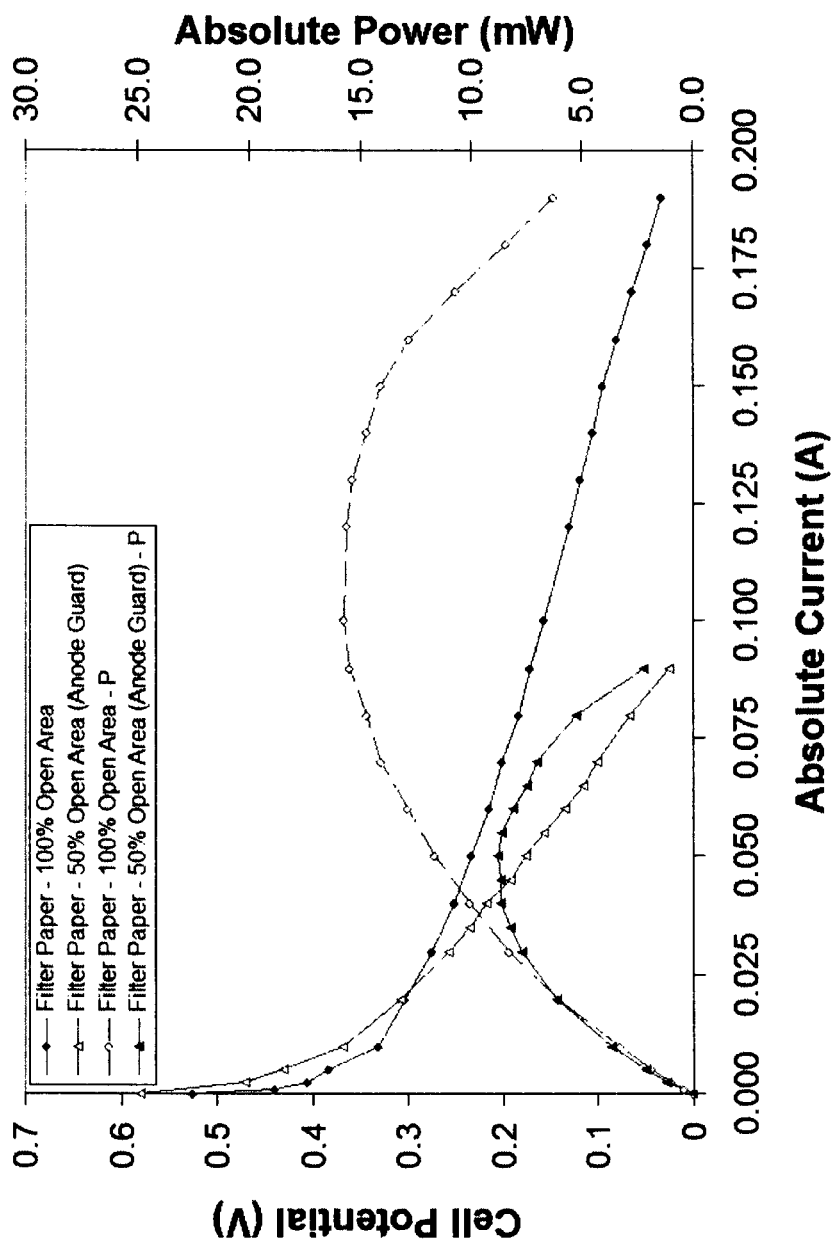
FIG. 18 is a graph of absolute polarization and power curves for another exemplary embodiment having a filter paper spacer and a guard covering an anode.

To further increase the effectiveness of the power control for the case where a guard is only used on the anode, a fuel cell similar to that described above was assembled, except that the open spacer was replaced with a hydrophilic glass filter paper (Fisherbrand G4 Inert Borosilicate). The filter paper was used to provide resistance to lateral fuel transport. Representative data for a fuel cell with a guard covering the anode are shown in FIG. 18.

Dynamically Adjustable Guard

Figure 19:
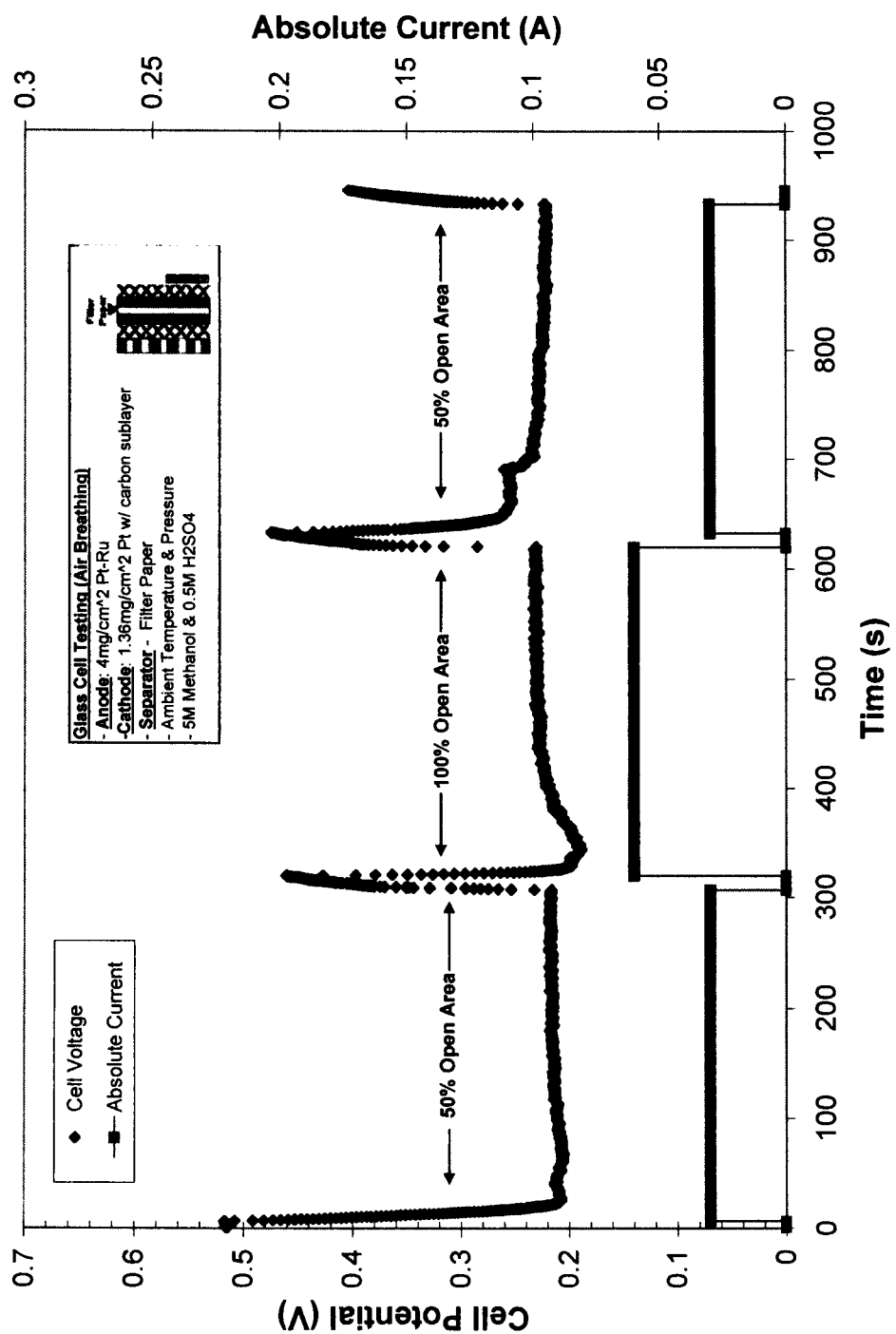
FIG. 19 is a graph of voltage and absolute current over time for a fuel cell with a manually operated guard on the cathode according to yet another exemplary embodiment.

FIG. 19 shows the voltage and current of the fuel cell with a manually operated guard on the cathode. When operating at an absolute current of 0.03 A, the guard was in a partially closed position, such that 50% of the total active area of the fuel cell was exposed for reactivity. When operating at an absolute current of 0.06 A, the guard was completely opened such that 100% of the total active area of the fuel cell was exposed and when the current returned to 0.03 A, the guard returned to a partially opened position, such that 50% of the total active area of the fuel cell was exposed for reactivity. At each current change the voltage and current density (A/cm$^2$) remained constant.

Figure 20:
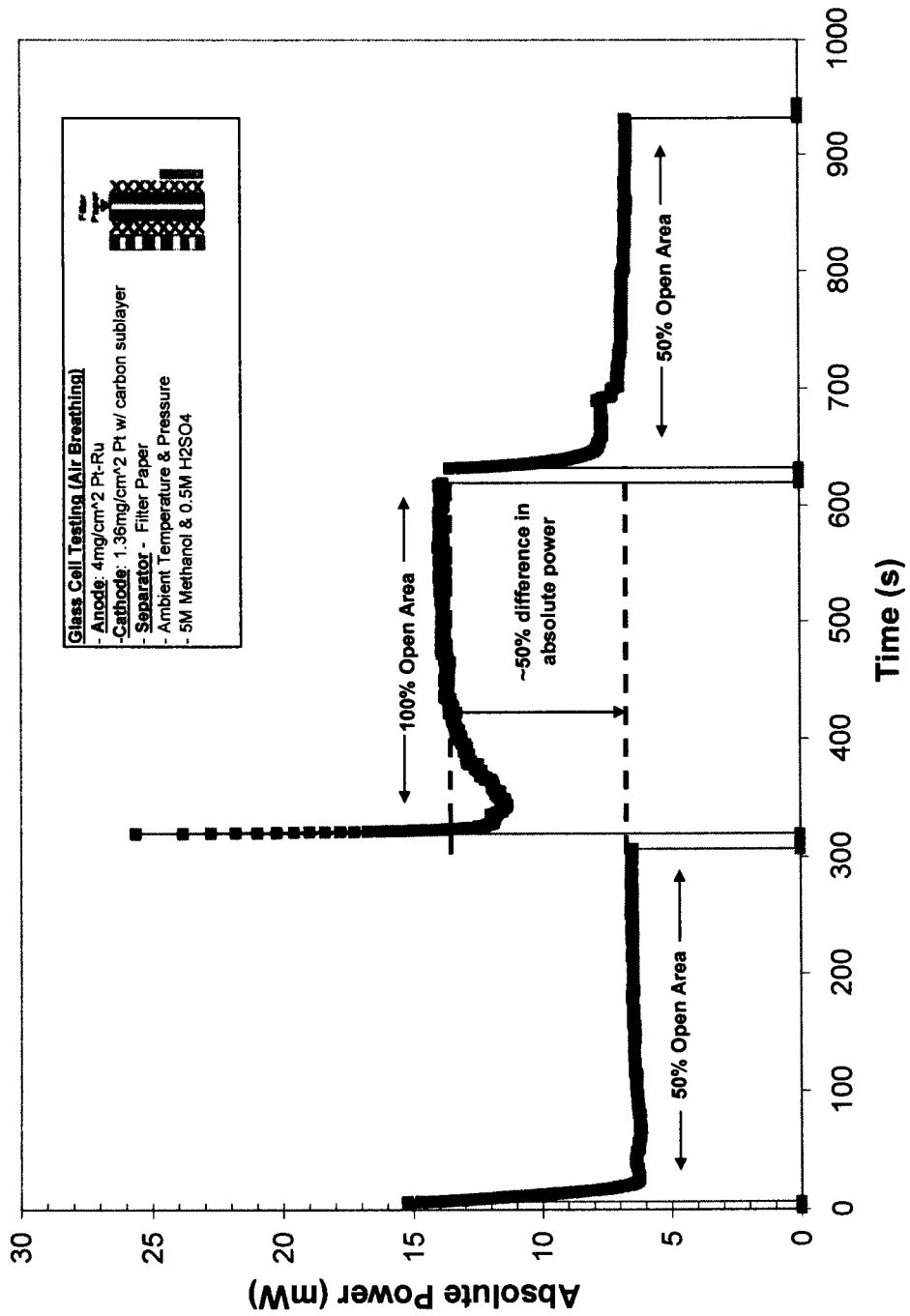
FIG. 20 is a graph of absolute power over time of the fuel cell shown graphed in FIG. 19.

FIG. 20 shows that a manually operated guard can be used to increase and decrease the absolute power output of the fuel cell.

What is claimed is:

1. A fuel cell comprising:
   an anode electrode having an anode inner face fluidly communicable with a fuel;
   a cathode electrode having a cathode inner face ionically communicable with and physically separated from the anode inner face, and having a cathode outer face fluidly communicable with an oxidant, the cathode inner face being ionically communicable with the anode inner face by an electrolyte; and
   at least one movable guard having a planar face positioned near at least one selected electrode surface comprising at least one of the anode inner face and the cathode inner face, each of the at least one selected electrode surface being planar, the at least one movable guard being configured to slide into a directly adjacent position that is directly adjacent to and covers a first portion of an active area of the at least one selected electrode surface, while leaving a second portion of the active area uncovered, thereby reducing the active area of the at least one selected electrode surface to an effective active area corresponding to the uncovered second portion, wherein the active area consists of a surface area and is at least a portion of an electrocatalyst-bearing surface area of the at least one selected electrode surface,
   wherein the planar face of the at least one movable guard is configured to substantially prevent the fuel, the oxidant, or the electrolyte from directly contacting the covered first portion of the active area such that the covered first portion of the active area does not contribute significantly to a power output of the fuel cell and the power output of the fuel cell is reduced.

2. A fuel cell as claimed in claim 1 further comprising a spacer assembly in between the anode and cathode electrodes and comprising a frame defining an electrolyte chamber in between the anode and the cathode electrodes, the electrolyte chamber for containing a liquid electrolyte that provides ionic communication between the anode and cathode inner faces.

3. A fuel cell as claimed in claim 2 wherein the planar face of the at least one movable guard is movable within the frame to block at least part of the anode and cathode inner faces from ionically communicating with each other.

4. A fuel cell as claimed in claim 1 wherein the planar face of the at least one movable guard is selected from a group consisting of: a solid plate, a perforated plate, and a diaphragm shutter.

5. A fuel cell system comprising:
   a fuel cell as claimed in claim 1;
   an actuator movably connected to the at least one movable guard; and
   an actuator controller communicative with the actuator and having a memory programmed with steps and instructions to control the actuator to move the planar face of the at least one movable guard into a position corresponding to a desired effective active area and consequent power output.

6. A fuel cell system as claimed in claim 5 wherein the desired effective active area is selected, and the actuator controller is programmed to control the actuator to move the at least one movable guard in response to varying load conditions on the fuel cell to produce a selected current density.

7. A fuel cell as claimed in claim 1 wherein the fuel cell is a passive fuel cell.

8. A fuel cell as claimed in claim 1 wherein the fuel cell is an active fuel cell.

9. A method for controlling an active area of a fuel cell comprising an anode, a cathode, and at least one movable guard , the anode having an anode inner face fluidly communicable with a fuel; the cathode having a cathode inner face ionically communicable with and physically separated from the anode inner face, the cathode having a cathode outer face fluidly communicable with an oxidant, the cathode inner face being ionically communicable with the anode inner face by an electrolyte; the at least one movable guard having a planar face positioned near at least one selected electrode surface comprising at least one of the anode inner face and the cathode inner face, each of the at least one selected electrode surface being planar; the method comprising:

sliding the at least one movable guard into a directly adjacent position that is directly adjacent to and covers a first portion of an active area of the at least one selected electrode surface, while leaving a second portion of the active area uncovered, thereby reducing the active area of the at least one selected electrode surface to an effective active area corresponding to the uncovered second portion, wherein the active area consists of a surface area and is at least a portion of an electrocatalyst-bearing surface area of the at least one selected electrode surface, wherein the planar face of the at least one movable guard is configured to substantially prevent the fuel, the oxidant, or the electrolyte from directly contacting the covered first portion of the active area such that the covered first portion of the active area does not contribute significantly to a power output of the fuel cell and the power output of the fuel cell is reduced.

10. A method as claimed in claim 9, wherein the effective active area is a first effective active area, and the method further comprises:

determining a load on the fuel cell at a particular fuel concentration; and moving the at least one movable guard to a position corresponding to a second effective active area that produces a selected current density in the fuel cell for the determined load at the particular fuel concentration.

11. A method as claimed in claim 10, further comprising: monitoring a varying load on the fuel cell; and moving the at least one movable guard in response to the varying load to produce a substantially constant current density in the fuel cell while maintaining a constant fuel concentration.

12. A method as claimed in claim 9, wherein the effective active area is a first effective active area, and the method further comprises:

determining a load on the fuel cell at a particular fuel concentration; and moving the at least one movable guard to a position corresponding to a second effective active area that produces a selected voltage of the fuel cell for the determined load at the particular fuel concentration.

13. A method as claimed in claim 12, further comprising: monitoring a varying load on the fuel cell; and moving the at least one movable guard in response to the varying load to produce a substantially constant voltage in the fuel cell while maintaining a constant fuel concentration.

14. A method as claimed in claim 9, further comprising: monitoring voltage in multiple active areas; and moving the at least one movable guard to block one or more of the multiple active areas that has a voltage that deviates from a selected level.

* * * * *